US010477148B2

(12) United States Patent
Bright-Thomas et al.

(10) Patent No.: US 10,477,148 B2
(45) Date of Patent: Nov. 12, 2019

(54) SPEAKER ANTICIPATION

(71) Applicant: Cisco Technology, Inc., San Jose, CA (US)

(72) Inventors: Paul Bright-Thomas, Wokingham (GB); Nathan Buckles, McKinney, TX (US); Keith Griffin, Galway (IE); Eric Chen, Palo Alto, CA (US); Manikandan Kesavan, Campbell, CA (US); Plamen Nedeltchev, San Jose, CA (US); Hugo Mike Latapie, Long Beach, CA (US); Enzo Fenoglio, Issy-les-Moulineaux (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/646,470

(22) Filed: Jul. 11, 2017

(65) Prior Publication Data
US 2018/0376108 A1 Dec. 27, 2018

Related U.S. Application Data

(60) Provisional application No. 62/524,014, filed on Jun. 23, 2017.

(51) Int. Cl.
H04N 7/15 (2006.01)
G06K 9/66 (2006.01)
(Continued)

(52) U.S. Cl.
CPC ......... H04N 7/152 (2013.01); G06K 9/00302 (2013.01); G06K 9/00711 (2013.01);
(Continued)

(58) Field of Classification Search
CPC combination set(s) only.
See application file for complete search history.

(56) References Cited

U.S. PATENT DOCUMENTS 4,460,807 A 7/1984 Kerr et al.
4,890,257 A 12/1989 Anthias et al.
(Continued)

FOREIGN PATENT DOCUMENTS

CN 101055561 10/2007
CN 101076060 11/2007
(Continued)

OTHER PUBLICATIONS

Hradis et al., "Voice Activity Detection from Gaze in Video Mediated Communication," ACM, Mar. 28-30, 2012 http://medusa.fit.vutbr.cz/TA2/TA2., pp. 1-4.
(Continued)

Primary Examiner — Phung-Hoang J Nguyen
(74) Attorney, Agent, or Firm — Polsinelli PC

(57) ABSTRACT

Systems and methods are disclosed for anticipating a video switch to accommodate a new speaker in a video conference comprising a real time video stream captured by a camera local to a first videoconference endpoint is analyzed according to at least one speaker anticipation model. The speaker anticipation model predicts that a new speaker is about to speak. Video of the anticipated new speaker is sent to the conferencing server in response to a request for the video on the anticipated new speaker from the conferencing server. Video of the anticipated new speaker is distributed to at least a second videoconference endpoint.

15 Claims, 9 Drawing Sheets

(51) Int. Cl.
*G06K 9/00* (2006.01)
*G10L 15/18* (2013.01)
*G10L 25/57* (2013.01)
*H04N 7/14* (2006.01)
*G06K 9/46* (2006.01)
*G06K 9/62* (2006.01)

(52) U.S. Cl.
CPC ....... *G06K 9/00718* (2013.01); *G06K 9/4628* (2013.01); *G06K 9/6274* (2013.01); *G06K 9/66* (2013.01); *G10L 15/1815* (2013.01); *G10L 25/57* (2013.01); *H04N 7/147* (2013.01); *H04N 7/15* (2013.01)

(56) References Cited

U.S. PATENT DOCUMENTS

| | | |
|---|---|---|
| 4,977,605 A | 12/1990 | Fardeau et al. |
| 5,185,848 A | 2/1993 | Aritsuka et al. |
| 5,293,430 A | 3/1994 | Shiau et al. |
| 5,694,563 A | 12/1997 | Belfiore et al. |
| 5,699,082 A | 12/1997 | Marks et al. |
| 5,745,711 A | 4/1998 | Kitahara et al. |
| 5,767,897 A | 6/1998 | Howell |
| 5,825,858 A | 10/1998 | Shaffer et al. |
| 5,874,962 A | 2/1999 | de Judicibus et al. |
| 5,889,671 A | 3/1999 | Autermann et al. |
| 5,917,537 A | 6/1999 | Lightfoot et al. |
| 5,970,064 A | 10/1999 | Clark et al. |
| 5,995,096 A | 11/1999 | Kitahara et al. |
| 6,023,606 A | 2/2000 | Monte et al. |
| 6,040,817 A | 3/2000 | Sumikawa |
| 6,075,531 A | 6/2000 | DeStefano |
| 6,085,166 A | 7/2000 | Beckhardt et al. |
| 6,115,393 A | 9/2000 | Engel et al. |
| 6,191,807 B1 | 2/2001 | Hamada et al. |
| 6,298,351 B1 | 10/2001 | Castelli et al. |
| 6,300,951 B1 | 10/2001 | Filetto et al. |
| 6,392,674 B1 | 5/2002 | Hiraki et al. |
| 6,424,370 B1 | 7/2002 | Courtney |
| 6,456,624 B1 | 9/2002 | Eccles et al. |
| 6,463,473 B1 | 10/2002 | Gubbi |
| 6,553,363 B1 | 4/2003 | Hoffman |
| 6,554,433 B1 | 4/2003 | Holler |
| 6,573,913 B1 | 6/2003 | Butler et al. |
| 6,597,684 B1 | 7/2003 | Gulati et al. |
| 6,646,997 B1 | 11/2003 | Baxley et al. |
| 6,665,396 B1 | 12/2003 | Khouri et al. |
| 6,697,325 B1 | 2/2004 | Cain |
| 6,700,979 B1 | 3/2004 | Washiya |
| 6,711,419 B1 | 3/2004 | Mori |
| 6,721,899 B1 | 4/2004 | Narvaez-Guarnieri et al. |
| 6,754,321 B1 | 6/2004 | Innes et al. |
| 6,754,335 B1 | 6/2004 | Shaffer et al. |
| RE38,609 E | 10/2004 | Chen Eric et al. |
| 6,816,464 B1 | 11/2004 | Scott et al. |
| 6,865,264 B2 | 3/2005 | Berstis |
| 6,894,714 B2 | 5/2005 | Gutta et al. |
| 6,938,208 B2 | 8/2005 | Reichardt |
| 6,954,617 B2 | 10/2005 | daCosta |
| 6,978,499 B2 | 12/2005 | Gallant et al. |
| 7,046,134 B2 | 5/2006 | Hansen |
| 7,046,794 B2 | 5/2006 | Piket et al. |
| 7,058,164 B1 | 6/2006 | Chan et al. |
| 7,058,710 B2 | 6/2006 | McCall et al. |
| 7,062,532 B1 | 6/2006 | Sweat et al. |
| 7,085,367 B1 | 8/2006 | Lang |
| 7,124,164 B1 | 10/2006 | Chemtob |
| 7,149,499 B1 | 12/2006 | Oran et al. |
| 7,180,993 B2 | 2/2007 | Hamilton |
| 7,185,077 B1 | 2/2007 | O'Toole et al. |
| 7,209,475 B1 | 4/2007 | Shaffer et al. |
| 7,340,151 B2 | 3/2008 | Taylor et al. |
| 7,366,310 B2 | 4/2008 | Stinson et al. |
| 7,418,664 B2 | 8/2008 | Ben-Shachar et al. |
| 7,441,198 B2 | 10/2008 | Dempski et al. |
| 7,453,864 B2 | 11/2008 | Kennedy et al. |
| 7,478,339 B2 | 1/2009 | Pettiross et al. |
| 7,496,650 B1 | 2/2009 | Previdi et al. |
| 7,500,200 B2 | 3/2009 | Kelso et al. |
| 7,530,022 B2 | 5/2009 | Ben-Shachar et al. |
| 7,552,177 B2 | 6/2009 | Kessen et al. |
| 7,577,711 B2 | 8/2009 | McArdle |
| 7,584,258 B2 | 9/2009 | Maresh |
| 7,587,028 B1 | 9/2009 | Broerman et al. |
| 7,606,714 B2 | 10/2009 | Williams et al. |
| 7,606,862 B2 | 10/2009 | Swearingen et al. |
| 7,620,902 B2 | 11/2009 | Manion et al. |
| 7,634,533 B2 | 12/2009 | Rudolph et al. |
| 7,774,407 B2 | 8/2010 | Daly et al. |
| 7,792,277 B2 | 9/2010 | Shaffer et al. |
| 7,826,372 B1 | 11/2010 | Mabe et al. |
| 7,826,400 B2 | 11/2010 | Sackauchi Masahiro |
| 7,830,814 B1 | 11/2010 | Allen et al. |
| 7,840,013 B2 | 11/2010 | Dedieu et al. |
| 7,840,980 B2 | 11/2010 | Gutta |
| 7,848,340 B2 | 12/2010 | Sackauchi et al. |
| 7,881,450 B1 | 2/2011 | Gentle et al. |
| 7,920,160 B2 | 4/2011 | Tamaru et al. |
| 7,956,869 B2 | 6/2011 | Gilra |
| 7,986,372 B2 | 7/2011 | Ma et al. |
| 7,995,464 B1 | 8/2011 | Croak et al. |
| 8,059,557 B1 | 11/2011 | Sigg et al. |
| 8,063,929 B2 | 11/2011 | Kurtz et al. |
| 8,081,205 B2 | 12/2011 | Baird et al. |
| 8,140,973 B2 | 3/2012 | Sandquist et al. |
| 8,154,583 B2 | 4/2012 | Kurtz et al. |
| 8,169,463 B2 | 5/2012 | Enstad et al. |
| 8,219,624 B2 | 7/2012 | Haynes et al. |
| 8,274,893 B2 | 9/2012 | Bansal et al. |
| 8,290,998 B2 | 10/2012 | Stienhans et al. |
| 8,301,883 B2 | 10/2012 | Sundaram et al. |
| 8,340,268 B2 | 12/2012 | Knaz |
| 8,358,327 B2 | 1/2013 | Duddy |
| 8,385,355 B1 | 2/2013 | Figueira et al. |
| 8,423,615 B1 | 4/2013 | Hayes |
| 8,428,234 B2 | 4/2013 | Knaz |
| 8,433,061 B2 | 4/2013 | Cutler |
| 8,434,019 B2 | 4/2013 | Nelson |
| 8,456,507 B1 | 6/2013 | Mallappa et al. |
| 8,462,103 B1 | 6/2013 | Moscovitch et al. |
| 8,478,848 B2 | 7/2013 | Minert |
| 8,489,765 B2 | 7/2013 | Vasseur et al. |
| 8,520,370 B2 | 8/2013 | Waitzman, III et al. |
| 8,620,840 B2 | 12/2013 | Newnham et al. |
| 8,625,749 B2 | 1/2014 | Jain et al. |
| 8,630,208 B1 | 1/2014 | Kjeldaas |
| 8,630,291 B2 | 1/2014 | Shaffer et al. |
| 8,634,314 B2 | 1/2014 | Banka et al. |
| 8,638,354 B2 | 1/2014 | Leow et al. |
| 8,638,778 B2 | 1/2014 | Lee et al. |
| 8,645,464 B2 | 2/2014 | Zimmet et al. |
| 8,675,847 B2 | 3/2014 | Shaffer et al. |
| 8,694,587 B2 | 4/2014 | Chaturvedi et al. |
| 8,694,593 B1 | 4/2014 | Wren et al. |
| 8,706,539 B1 | 4/2014 | Mohler |
| 8,707,194 B1 | 4/2014 | Jenkins et al. |
| 8,732,149 B2 | 5/2014 | Lida et al. |
| 8,738,080 B2 | 5/2014 | Nhiayi et al. |
| 8,751,572 B1 | 6/2014 | Behforooz et al. |
| 8,767,716 B2 | 7/2014 | Trabelsi et al. |
| 8,774,164 B2 | 7/2014 | Klein et al. |
| 8,831,505 B1 | 9/2014 | Seshadri |
| 8,842,161 B2 | 9/2014 | Feng et al. |
| 8,850,203 B2 | 9/2014 | Sundaram et al. |
| 8,856,584 B2 | 10/2014 | Matsubara |
| 8,860,774 B1 | 10/2014 | Sheeley et al. |
| 8,862,522 B1 | 10/2014 | Jaiswal et al. |
| 8,874,644 B2 | 10/2014 | Allen et al. |
| 8,880,477 B2 | 11/2014 | Barker et al. |
| 8,890,924 B2 | 11/2014 | Wu |
| 8,892,646 B2 | 11/2014 | Chaturvedi et al. |
| 8,914,444 B2 | 12/2014 | Hladik, Jr. |
| 8,914,472 B1 | 12/2014 | Lee et al. |

(56) References Cited

U.S. PATENT DOCUMENTS

| | | |
|---|---|---|
| 8,924,862 B1 | 12/2014 | Luo |
| 8,930,840 B1 | 1/2015 | Riskö et al. |
| 8,942,085 B1 | 1/2015 | Pani et al. |
| 8,947,493 B2 | 2/2015 | Lian et al. |
| 8,948,054 B2 | 2/2015 | Kreeger et al. |
| 8,972,494 B2 | 3/2015 | Chen et al. |
| 8,982,707 B2 | 3/2015 | Moreno et al. |
| 9,003,445 B1 | 4/2015 | Rowe |
| 9,031,839 B2 | 5/2015 | Thorsen et al. |
| 9,032,028 B2 | 5/2015 | Davidson et al. |
| 9,075,572 B2 | 7/2015 | Ayoub et al. |
| 9,118,612 B2 | 8/2015 | Fish et al. |
| 9,131,017 B2 | 9/2015 | Kurupacheril et al. |
| 9,137,119 B2 | 9/2015 | Yang et al. |
| 9,137,376 B1 | 9/2015 | Basart et al. |
| 9,143,729 B2 | 9/2015 | Anand et al. |
| 9,165,281 B2 | 10/2015 | Orsolini et al. |
| 9,197,553 B2 | 11/2015 | Jain et al. |
| 9,197,701 B1 | 11/2015 | Petrov et al. |
| 9,197,848 B2 | 11/2015 | Felkai et al. |
| 9,201,527 B2 | 12/2015 | Kripalani et al. |
| 9,203,875 B2 | 12/2015 | Huang et al. |
| 9,204,099 B2 | 12/2015 | Brown |
| 9,219,735 B2 | 12/2015 | Hoard et al. |
| 9,246,855 B2 | 1/2016 | Maehiro |
| 9,258,033 B2 | 2/2016 | Showering |
| 9,268,398 B2 | 2/2016 | Tipirneni |
| 9,298,342 B2 | 3/2016 | Zhang et al. |
| 9,323,417 B2 | 4/2016 | Sun et al. |
| 9,324,022 B2 | 4/2016 | Williams, Jr. et al. |
| 9,335,892 B2 | 5/2016 | Ubillos |
| 9,338,065 B2 | 5/2016 | Vasseur et al. |
| 9,338,084 B2 | 5/2016 | Badoni |
| 9,349,119 B2 | 5/2016 | Desai et al. |
| 9,367,224 B2 | 6/2016 | Ananthakrishnan et al. |
| 9,369,673 B2 | 6/2016 | Ma et al. |
| 9,374,294 B1 | 6/2016 | Pani |
| 9,407,621 B2 | 8/2016 | Vakil et al. |
| 9,419,811 B2 | 8/2016 | Dong et al. |
| 9,432,512 B2 | 8/2016 | You |
| 9,449,303 B2 | 9/2016 | Underhill et al. |
| 9,495,664 B2 | 11/2016 | Cole et al. |
| 9,513,861 B2 | 12/2016 | Lin et al. |
| 9,516,022 B2 | 12/2016 | Borzycki et al. |
| 9,525,711 B2 | 12/2016 | Ackerman et al. |
| 9,544,224 B2 | 1/2017 | Chu et al. |
| 9,553,799 B2 | 1/2017 | Tarricone et al. |
| 9,558,451 B2 | 1/2017 | Nilsson et al. |
| 9,563,480 B2 | 2/2017 | Messerli et al. |
| 9,596,099 B2 | 3/2017 | Yang et al. |
| 9,609,030 B2 | 3/2017 | Sun et al. |
| 9,609,514 B2 | 3/2017 | Mistry et al. |
| 9,614,756 B2 | 4/2017 | Joshi |
| 9,640,194 B1 | 5/2017 | Nemala et al. |
| 9,654,385 B2 | 5/2017 | Chu et al. |
| 9,667,799 B2 | 5/2017 | Olivier et al. |
| 9,674,625 B2 | 6/2017 | Armstrong-Mutner |
| 9,762,709 B1 | 9/2017 | Snyder et al. |
| 2001/0030661 A1 | 10/2001 | Reichardt |
| 2002/0018051 A1 | 2/2002 | Singh |
| 2002/0061001 A1 | 5/2002 | Garcia-Luna-Aceves et al. |
| 2002/0076003 A1 | 6/2002 | Zellner et al. |
| 2002/0078153 A1 | 6/2002 | Chung et al. |
| 2002/0101505 A1* | 8/2002 | Gutta ............... H04N 7/15 348/14.07 |
| 2002/0105904 A1 | 8/2002 | Hauser et al. |
| 2002/0116154 A1 | 8/2002 | Nowak et al. |
| 2002/0140736 A1 | 10/2002 | Chen |
| 2002/0159386 A1 | 10/2002 | Grosdidier et al. |
| 2002/0188522 A1 | 12/2002 | McCall et al. |
| 2003/0005149 A1 | 1/2003 | Haas et al. |
| 2003/0028647 A1 | 2/2003 | Grosu |
| 2003/0046421 A1 | 3/2003 | Horvitz et al. |
| 2003/0061340 A1 | 3/2003 | Sun et al. |
| 2003/0067912 A1 | 4/2003 | Mead et al. |
| 2003/0068087 A1 | 4/2003 | Wu et al. |
| 2003/0091052 A1 | 5/2003 | Pate et al. |
| 2003/0117992 A1 | 6/2003 | Kim et al. |
| 2003/0133417 A1 | 7/2003 | Badt, Jr. |
| 2003/0154250 A1 | 8/2003 | Miyashita |
| 2003/0174826 A1 | 9/2003 | Hesse |
| 2003/0187800 A1 | 10/2003 | Moore et al. |
| 2003/0197739 A1 | 10/2003 | Bauer |
| 2003/0225549 A1 | 12/2003 | Shay et al. |
| 2003/0227423 A1 | 12/2003 | Arai et al. |
| 2004/0039909 A1 | 2/2004 | Cheng |
| 2004/0054885 A1 | 3/2004 | Bartram et al. |
| 2004/0098456 A1 | 5/2004 | Krzyzanowski et al. |
| 2004/0153563 A1 | 8/2004 | Shay et al. |
| 2004/0210637 A1 | 10/2004 | Loveland |
| 2004/0218525 A1 | 11/2004 | Elie-Dit-Cosaque et al. |
| 2004/0253991 A1 | 12/2004 | Azuma |
| 2004/0267938 A1 | 12/2004 | Shoroff et al. |
| 2005/0014490 A1 | 1/2005 | Desai et al. |
| 2005/0031136 A1 | 2/2005 | Du et al. |
| 2005/0048916 A1 | 3/2005 | Suh |
| 2005/0055405 A1 | 3/2005 | Kaminsky et al. |
| 2005/0055412 A1 | 3/2005 | Kaminsky et al. |
| 2005/0085243 A1 | 4/2005 | Boyer et al. |
| 2005/0099492 A1 | 5/2005 | Orr |
| 2005/0108328 A1 | 5/2005 | Berkeland et al. |
| 2005/0111487 A1 | 5/2005 | Matta et al. |
| 2005/0114532 A1 | 5/2005 | Chess et al. |
| 2005/0131774 A1 | 6/2005 | Huxter |
| 2005/0143979 A1 | 6/2005 | Lee et al. |
| 2005/0175208 A1 | 8/2005 | Shaw et al. |
| 2005/0215229 A1 | 9/2005 | Cheng |
| 2005/0226511 A1 | 10/2005 | Short |
| 2005/0231588 A1 | 10/2005 | Yang et al. |
| 2005/0286711 A1 | 12/2005 | Lee et al. |
| 2006/0004911 A1 | 1/2006 | Becker et al. |
| 2006/0020697 A1 | 1/2006 | Kelso et al. |
| 2006/0026255 A1 | 2/2006 | Malamud et al. |
| 2006/0072471 A1 | 4/2006 | Shiozawa |
| 2006/0083193 A1 | 4/2006 | Womack et al. |
| 2006/0083305 A1 | 4/2006 | Dougherty et al. |
| 2006/0084471 A1 | 4/2006 | Walter |
| 2006/0116146 A1 | 6/2006 | Herrod et al. |
| 2006/0133404 A1 | 6/2006 | Zuniga et al. |
| 2006/0164552 A1 | 7/2006 | Cutler |
| 2006/0224430 A1 | 10/2006 | Butt |
| 2006/0250987 A1 | 11/2006 | White et al. |
| 2006/0271624 A1 | 11/2006 | Lyle et al. |
| 2006/0274647 A1 | 12/2006 | Wang et al. |
| 2007/0005752 A1 | 1/2007 | Chawla et al. |
| 2007/0021973 A1 | 1/2007 | Stremler |
| 2007/0025576 A1 | 2/2007 | Wen |
| 2007/0041366 A1 | 2/2007 | Vugenfirer et al. |
| 2007/0047707 A1 | 3/2007 | Mayer et al. |
| 2007/0058842 A1 | 3/2007 | Vallone et al. |
| 2007/0067387 A1 | 3/2007 | Jain et al. |
| 2007/0071030 A1 | 3/2007 | Lee |
| 2007/0083650 A1 | 4/2007 | Collomb et al. |
| 2007/0091831 A1 | 4/2007 | Croy et al. |
| 2007/0100986 A1 | 5/2007 | Bagley et al. |
| 2007/0106747 A1 | 5/2007 | Singh et al. |
| 2007/0116225 A1 | 5/2007 | Zhao et al. |
| 2007/0120966 A1* | 5/2007 | Murai ............... H04N 7/147 348/14.08 |
| 2007/0139626 A1 | 6/2007 | Saleh et al. |
| 2007/0149249 A1 | 6/2007 | Chen et al. |
| 2007/0150453 A1 | 6/2007 | Morita |
| 2007/0168444 A1 | 7/2007 | Chen et al. |
| 2007/0192065 A1 | 8/2007 | Riggs et al. |
| 2007/0198637 A1 | 8/2007 | Deboy et al. |
| 2007/0208590 A1 | 9/2007 | Dorricott et al. |
| 2007/0248244 A1 | 10/2007 | Sato et al. |
| 2007/0250567 A1 | 10/2007 | Graham et al. |
| 2008/0049622 A1 | 2/2008 | Previdi et al. |
| 2008/0059986 A1 | 3/2008 | Kalinowski et al. |
| 2008/0068447 A1 | 3/2008 | Mattila et al. |
| 2008/0071868 A1 | 3/2008 | Arenburg et al. |
| 2008/0080532 A1 | 4/2008 | O'Sullivan et al. |
| 2008/0089246 A1 | 4/2008 | Ghanwani et al. |

(56) References Cited

U.S. PATENT DOCUMENTS

| | | |
|---|---|---|
| 2008/0107255 A1 | 5/2008 | Geva et al. |
| 2008/0133663 A1 | 6/2008 | Lentz |
| 2008/0140817 A1 | 6/2008 | Agarwal et al. |
| 2008/0154863 A1 | 6/2008 | Goldstein |
| 2008/0159151 A1 | 7/2008 | Datz et al. |
| 2008/0181259 A1 | 7/2008 | Andreev et al. |
| 2008/0192651 A1 | 8/2008 | Gibbings |
| 2008/0209452 A1 | 8/2008 | Ebert et al. |
| 2008/0270211 A1 | 10/2008 | Vander Veen et al. |
| 2008/0278894 A1 | 11/2008 | Chen et al. |
| 2008/0293353 A1 | 11/2008 | Mody et al. |
| 2009/0003232 A1 | 1/2009 | Vaswani et al. |
| 2009/0010264 A1 | 1/2009 | Zhang |
| 2009/0012963 A1 | 1/2009 | Johnson et al. |
| 2009/0019374 A1 | 1/2009 | Logan et al. |
| 2009/0049151 A1 | 2/2009 | Pagan |
| 2009/0064245 A1 | 3/2009 | Facemire et al. |
| 2009/0073988 A1 | 3/2009 | Ghodrat et al. |
| 2009/0075633 A1 | 3/2009 | Lee et al. |
| 2009/0089822 A1 | 4/2009 | Wada |
| 2009/0094088 A1 | 4/2009 | Chen et al. |
| 2009/0100142 A1 | 4/2009 | Stern et al. |
| 2009/0119373 A1 | 5/2009 | Denner et al. |
| 2009/0129316 A1 | 5/2009 | Ramanathan et al. |
| 2009/0132949 A1 | 5/2009 | Bosarge |
| 2009/0147714 A1 | 6/2009 | Jain et al. |
| 2009/0147737 A1 | 6/2009 | Tacconi et al. |
| 2009/0168653 A1 | 7/2009 | St. Pierre et al. |
| 2009/0193327 A1 | 7/2009 | Roychoudhuri et al. |
| 2009/0234667 A1 | 9/2009 | Thayne |
| 2009/0254619 A1 | 10/2009 | Kho et al. |
| 2009/0256901 A1 | 10/2009 | Mauchly et al. |
| 2009/0271467 A1 | 10/2009 | Boers et al. |
| 2009/0278851 A1 | 11/2009 | Ach et al. |
| 2009/0282104 A1 | 11/2009 | O'Sullivan et al. |
| 2009/0292999 A1 | 11/2009 | LaBine et al. |
| 2009/0296908 A1 | 12/2009 | Lee et al. |
| 2009/0303908 A1 | 12/2009 | Deb et al. |
| 2009/0306981 A1 | 12/2009 | Cromack et al. |
| 2009/0309846 A1 | 12/2009 | Trachtenberg et al. |
| 2009/0313334 A1 | 12/2009 | Seacat et al. |
| 2010/0005142 A1 | 1/2010 | Xiao et al. |
| 2010/0005402 A1 | 1/2010 | George et al. |
| 2010/0031192 A1 | 2/2010 | Kong |
| 2010/0046504 A1 | 2/2010 | Hill |
| 2010/0061538 A1 | 3/2010 | Coleman et al. |
| 2010/0070640 A1 | 3/2010 | Allen, Jr. et al. |
| 2010/0073454 A1 | 3/2010 | Lovhaugen et al. |
| 2010/0077109 A1 | 3/2010 | Yan et al. |
| 2010/0094867 A1 | 4/2010 | Badros et al. |
| 2010/0095327 A1 | 4/2010 | Fujinaka et al. |
| 2010/0121959 A1 | 5/2010 | Lin et al. |
| 2010/0131856 A1 | 5/2010 | Kalbfleisch et al. |
| 2010/0157978 A1 | 6/2010 | Robbins et al. |
| 2010/0162170 A1 | 6/2010 | Johns et al. |
| 2010/0165863 A1 | 7/2010 | Nakata |
| 2010/0183179 A1 | 7/2010 | Griffin, Jr. et al. |
| 2010/0211872 A1 | 8/2010 | Rolston et al. |
| 2010/0215334 A1 | 8/2010 | Miyagi |
| 2010/0220615 A1 | 9/2010 | Enstrom et al. |
| 2010/0241691 A1 | 9/2010 | Savitzky et al. |
| 2010/0245535 A1 | 9/2010 | Mauchly |
| 2010/0250817 A1 | 9/2010 | Collopy et al. |
| 2010/0262266 A1 | 10/2010 | Chang et al. |
| 2010/0262925 A1 | 10/2010 | Liu et al. |
| 2010/0275164 A1 | 10/2010 | Morikawa |
| 2010/0302033 A1 | 12/2010 | Devenyi et al. |
| 2010/0303227 A1 | 12/2010 | Gupta |
| 2010/0316207 A1 | 12/2010 | Brunson |
| 2010/0318399 A1 | 12/2010 | Li et al. |
| 2011/0072037 A1 | 3/2011 | Lotzer |
| 2011/0075830 A1 | 3/2011 | Dreher et al. |
| 2011/0082596 A1 | 4/2011 | Meagher et al. |
| 2011/0087745 A1 | 4/2011 | O'Sullivan et al. |
| 2011/0116389 A1 | 5/2011 | Tao et al. |
| 2011/0117535 A1 | 5/2011 | Benko et al. |
| 2011/0131498 A1 | 6/2011 | Chao et al. |
| 2011/0149759 A1 | 6/2011 | Jollota |
| 2011/0154427 A1 | 6/2011 | Wei |
| 2011/0228696 A1 | 9/2011 | Agarwal et al. |
| 2011/0230209 A1 | 9/2011 | Kilian |
| 2011/0255570 A1 | 10/2011 | Fujiwara |
| 2011/0264928 A1 | 10/2011 | Hinckley |
| 2011/0267962 A1 | 11/2011 | J S A et al. |
| 2011/0270609 A1 | 11/2011 | Jones et al. |
| 2011/0271211 A1 | 11/2011 | Jones et al. |
| 2011/0274283 A1 | 11/2011 | Athanas |
| 2011/0283226 A1 | 11/2011 | Basson et al. |
| 2011/0314139 A1 | 12/2011 | Song et al. |
| 2012/0009890 A1 | 1/2012 | Curcio et al. |
| 2012/0013704 A1 | 1/2012 | Sawayanagi et al. |
| 2012/0013768 A1 | 1/2012 | Zurek et al. |
| 2012/0026279 A1 | 2/2012 | Kato |
| 2012/0054288 A1 | 3/2012 | Wiese et al. |
| 2012/0072364 A1 | 3/2012 | Ho |
| 2012/0075999 A1 | 3/2012 | Ko et al. |
| 2012/0084714 A1 | 4/2012 | Sirpal et al. |
| 2012/0092436 A1 | 4/2012 | Pahud et al. |
| 2012/0140970 A1 | 6/2012 | Kim et al. |
| 2012/0163177 A1 | 6/2012 | Vaswani et al. |
| 2012/0179502 A1 | 7/2012 | Farooq et al. |
| 2012/0190386 A1 | 7/2012 | Anderson |
| 2012/0192075 A1 | 7/2012 | Ebtekar et al. |
| 2012/0213062 A1 | 8/2012 | Liang et al. |
| 2012/0213124 A1 | 8/2012 | Vasseur et al. |
| 2012/0233020 A1 | 9/2012 | Eberstadt et al. |
| 2012/0246229 A1 | 9/2012 | Carr et al. |
| 2012/0246596 A1 | 9/2012 | Ording et al. |
| 2012/0284635 A1 | 11/2012 | Sitrick et al. |
| 2012/0296957 A1 | 11/2012 | Stinson et al. |
| 2012/0303476 A1 | 11/2012 | Krzyzanowski et al. |
| 2012/0306757 A1 | 12/2012 | Keist et al. |
| 2012/0306993 A1 | 12/2012 | Sellers-Blais |
| 2012/0307629 A1 | 12/2012 | Vasseur et al. |
| 2012/0308202 A1 | 12/2012 | Murata et al. |
| 2012/0313971 A1 | 12/2012 | Murata et al. |
| 2012/0315011 A1 | 12/2012 | Messmer et al. |
| 2012/0321058 A1 | 12/2012 | Eng et al. |
| 2012/0323645 A1 | 12/2012 | Spiegel et al. |
| 2012/0324512 A1 | 12/2012 | Cahnbley et al. |
| 2013/0003542 A1 | 1/2013 | Catovic et al. |
| 2013/0010610 A1 | 1/2013 | Karthikeyan et al. |
| 2013/0027425 A1 | 1/2013 | Yuan |
| 2013/0028073 A1 | 1/2013 | Tatipamula et al. |
| 2013/0038675 A1 | 2/2013 | Malik |
| 2013/0047093 A1 | 2/2013 | Reuschel et al. |
| 2013/0050398 A1 | 2/2013 | Krans et al. |
| 2013/0055112 A1 | 2/2013 | Joseph et al. |
| 2013/0061054 A1 | 3/2013 | Niccolai |
| 2013/0063542 A1 | 3/2013 | Bhat et al. |
| 2013/0070755 A1 | 3/2013 | Trabelsi et al. |
| 2013/0086633 A1 | 4/2013 | Schultz |
| 2013/0090065 A1 | 4/2013 | Fisunenko et al. |
| 2013/0091205 A1 | 4/2013 | Kotler et al. |
| 2013/0091440 A1 | 4/2013 | Kotler et al. |
| 2013/0094647 A1 | 4/2013 | Mauro et al. |
| 2013/0113602 A1 | 5/2013 | Gilbertson et al. |
| 2013/0113827 A1 | 5/2013 | Forutanpour et al. |
| 2013/0120522 A1 | 5/2013 | Lian et al. |
| 2013/0124551 A1 | 5/2013 | Foo |
| 2013/0128720 A1 | 5/2013 | Kim et al. |
| 2013/0129252 A1 | 5/2013 | Lauper et al. |
| 2013/0135837 A1 | 5/2013 | Kemppinen |
| 2013/0141371 A1 | 6/2013 | Hallford et al. |
| 2013/0148789 A1 | 6/2013 | Hillier et al. |
| 2013/0177305 A1 | 7/2013 | Prakash et al. |
| 2013/0182063 A1 | 7/2013 | Jaiswal et al. |
| 2013/0185672 A1 | 7/2013 | McCormick et al. |
| 2013/0198629 A1 | 8/2013 | Tandon et al. |
| 2013/0210496 A1 | 8/2013 | Zakarias et al. |
| 2013/0211826 A1 | 8/2013 | Mannby |
| 2013/0212202 A1 | 8/2013 | Lee |
| 2013/0215215 A1 | 8/2013 | Gage et al. |
| 2013/0219278 A1 | 8/2013 | Rosenberg |

(56) References Cited

U.S. PATENT DOCUMENTS

| | | |
|---|---|---|
| 2013/0222246 A1 | 8/2013 | Booms et al. |
| 2013/0225080 A1 | 8/2013 | Doss et al. |
| 2013/0227433 A1 | 8/2013 | Doray et al. |
| 2013/0235866 A1 | 9/2013 | Tian et al. |
| 2013/0242030 A1 | 9/2013 | Kato et al. |
| 2013/0243213 A1 | 9/2013 | Moquin |
| 2013/0250754 A1 | 9/2013 | Vasseur et al. |
| 2013/0252669 A1 | 9/2013 | Nhiayi |
| 2013/0263020 A1 | 10/2013 | Heiferman et al. |
| 2013/0275589 A1 | 10/2013 | Karthikeyan et al. |
| 2013/0290421 A1 | 10/2013 | Benson et al. |
| 2013/0297704 A1 | 11/2013 | Alberth, Jr. et al. |
| 2013/0300637 A1 | 11/2013 | Smits et al. |
| 2013/0311673 A1 | 11/2013 | Karthikeyan et al. |
| 2013/0325970 A1 | 12/2013 | Roberts et al. |
| 2013/0329865 A1 | 12/2013 | Ristock et al. |
| 2013/0335507 A1 | 12/2013 | Aarrestad et al. |
| 2014/0012990 A1 | 1/2014 | Ko |
| 2014/0028781 A1 | 1/2014 | MacDonald |
| 2014/0040404 A1 | 2/2014 | Pujare et al. |
| 2014/0040819 A1 | 2/2014 | Duffy |
| 2014/0049595 A1* | 2/2014 | Feng .................. H04N 7/15 348/14.08 |
| 2014/0063174 A1 | 3/2014 | Junuzovic et al. |
| 2014/0068452 A1 | 3/2014 | Joseph et al. |
| 2014/0068670 A1 | 3/2014 | Timmermann et al. |
| 2014/0078182 A1 | 3/2014 | Utsunomiya |
| 2014/0108486 A1 | 4/2014 | Borzycki et al. |
| 2014/0111597 A1 | 4/2014 | Anderson et al. |
| 2014/0126423 A1 | 5/2014 | Vasseur et al. |
| 2014/0133327 A1 | 5/2014 | Miyauchi |
| 2014/0136630 A1 | 5/2014 | Siegel et al. |
| 2014/0157338 A1 | 6/2014 | Pearce |
| 2014/0161243 A1 | 6/2014 | Contreras et al. |
| 2014/0195557 A1 | 7/2014 | Oztaskent et al. |
| 2014/0198175 A1 | 7/2014 | Shaffer et al. |
| 2014/0204759 A1 | 7/2014 | Guo et al. |
| 2014/0207945 A1 | 7/2014 | Galloway et al. |
| 2014/0215077 A1 | 7/2014 | Soudan et al. |
| 2014/0219103 A1 | 8/2014 | Vasseur et al. |
| 2014/0237371 A1 | 8/2014 | Klemm et al. |
| 2014/0253671 A1 | 9/2014 | Bentley et al. |
| 2014/0280595 A1 | 9/2014 | Mani et al. |
| 2014/0282213 A1 | 9/2014 | Musa et al. |
| 2014/0293955 A1 | 10/2014 | Keerthi |
| 2014/0296112 A1 | 10/2014 | O'Driscoll et al. |
| 2014/0298210 A1 | 10/2014 | Park et al. |
| 2014/0317561 A1 | 10/2014 | Robinson et al. |
| 2014/0337840 A1 | 11/2014 | Hyde et al. |
| 2014/0358264 A1 | 12/2014 | Long et al. |
| 2014/0372908 A1 | 12/2014 | Kashi et al. |
| 2015/0004571 A1 | 1/2015 | Ironside et al. |
| 2015/0009278 A1 | 1/2015 | Modai et al. |
| 2015/0023174 A1 | 1/2015 | Dasgupta et al. |
| 2015/0029301 A1 | 1/2015 | Nakatomi et al. |
| 2015/0052095 A1 | 2/2015 | Yang et al. |
| 2015/0067552 A1 | 3/2015 | Leorin et al. |
| 2015/0070835 A1 | 3/2015 | Mclean |
| 2015/0074189 A1 | 3/2015 | Cox et al. |
| 2015/0081885 A1 | 3/2015 | Thomas et al. |
| 2015/0082350 A1 | 3/2015 | Ogasawara et al. |
| 2015/0085060 A1 | 3/2015 | Fish et al. |
| 2015/0088575 A1 | 3/2015 | Asli et al. |
| 2015/0089393 A1 | 3/2015 | Zhang et al. |
| 2015/0089394 A1 | 3/2015 | Chen et al. |
| 2015/0113050 A1 | 4/2015 | Stahl |
| 2015/0113369 A1 | 4/2015 | Chan et al. |
| 2015/0128068 A1 | 5/2015 | Kim |
| 2015/0142702 A1 | 5/2015 | Nilsson et al. |
| 2015/0172120 A1 | 6/2015 | Dwarampudi et al. |
| 2015/0178626 A1 | 6/2015 | Pielot et al. |
| 2015/0215365 A1 | 7/2015 | Shaffer et al. |
| 2015/0254760 A1 | 9/2015 | Pepper |
| 2015/0288774 A1 | 10/2015 | Larabie-Belanger |
| 2015/0301691 A1 | 10/2015 | Qin |
| 2015/0304120 A1 | 10/2015 | Xiao et al. |
| 2015/0304366 A1 | 10/2015 | Bader-Natal et al. |
| 2015/0319113 A1 | 11/2015 | Gunderson et al. |
| 2015/0324689 A1 | 11/2015 | Wierzynski et al. |
| 2015/0350126 A1 | 12/2015 | Xue |
| 2015/0358248 A1 | 12/2015 | Saha et al. |
| 2015/0365725 A1* | 12/2015 | Belyaev ............... H04N 21/458 725/46 |
| 2015/0373063 A1 | 12/2015 | Vashishtha et al. |
| 2015/0373414 A1 | 12/2015 | Kinoshita |
| 2016/0037304 A1 | 2/2016 | Dunkin et al. |
| 2016/0043986 A1 | 2/2016 | Ronkainen |
| 2016/0044159 A1 | 2/2016 | Wolff et al. |
| 2016/0044380 A1 | 2/2016 | Barrett |
| 2016/0050079 A1 | 2/2016 | Martin De Nicolas et al. |
| 2016/0050160 A1 | 2/2016 | Li et al. |
| 2016/0050175 A1 | 2/2016 | Chaudhry et al. |
| 2016/0070758 A1 | 3/2016 | Thomson et al. |
| 2016/0071056 A1 | 3/2016 | Ellison et al. |
| 2016/0072862 A1 | 3/2016 | Bader-Natal et al. |
| 2016/0094593 A1 | 3/2016 | Priya |
| 2016/0105345 A1 | 4/2016 | Kim et al. |
| 2016/0110056 A1 | 4/2016 | Hong et al. |
| 2016/0165056 A1 | 6/2016 | Bargetzi et al. |
| 2016/0173537 A1 | 6/2016 | Kumar et al. |
| 2016/0182580 A1 | 6/2016 | Nayak |
| 2016/0203404 A1 | 7/2016 | Cherkasova et al. |
| 2016/0266609 A1 | 9/2016 | McCracken |
| 2016/0269411 A1 | 9/2016 | Malachi |
| 2016/0277461 A1 | 9/2016 | Sun et al. |
| 2016/0283909 A1 | 9/2016 | Adiga |
| 2016/0307165 A1 | 10/2016 | Grodum et al. |
| 2016/0309037 A1 | 10/2016 | Rosenberg et al. |
| 2016/0315802 A1 | 10/2016 | Wei et al. |
| 2016/0321347 A1 | 11/2016 | Zhou et al. |
| 2016/0335111 A1 | 11/2016 | Bruun et al. |
| 2017/0006162 A1 | 1/2017 | Bargetzi et al. |
| 2017/0006446 A1 | 1/2017 | Harris et al. |
| 2017/0070706 A1 | 3/2017 | Ursin et al. |
| 2017/0093874 A1 | 3/2017 | Uthe |
| 2017/0104961 A1 | 4/2017 | Pan et al. |
| 2017/0150399 A1 | 5/2017 | Kedalagudde et al. |
| 2017/0171260 A1 | 6/2017 | Jerrard-Dunne et al. |
| 2017/0228251 A1 | 8/2017 | Yang et al. |
| 2017/0289033 A1 | 10/2017 | Singh et al. |
| 2017/0324850 A1 | 11/2017 | Snyder et al. |
| 2017/0347308 A1 | 11/2017 | Chou et al. |
| 2017/0353361 A1 | 12/2017 | Chopra et al. |
| 2018/0013656 A1 | 1/2018 | Chen |
| 2018/0166066 A1* | 6/2018 | Dimitriadis ............. G10L 15/04 |

FOREIGN PATENT DOCUMENTS

| | | |
|---|---|---|
| CN | 102572370 | 7/2012 |
| CN | 102655583 | 9/2012 |
| CN | 101729528 | 11/2012 |
| CN | 102938834 | 2/2013 |
| CN | 102004671 | 3/2013 |
| CN | 103141086 | 6/2013 |
| CN | 204331453 | 5/2015 |
| DE | 3843033 | 9/1991 |
| EP | 959585 | 11/1999 |
| EP | 2773131 | 9/2014 |
| EP | 2341686 | 8/2016 |
| WO | WO 98/55903 | 12/1998 |
| WO | WO 2008/139269 | 11/2008 |
| WO | WO 2012/167262 | 12/2012 |
| WO | WO 2014/118736 | 8/2014 |

OTHER PUBLICATIONS

Akkaya, Kemal, et al., "A survey on routing protocols for wireless sensor networks" Abstract, 1 page, Ad Hoc Networks, May 2005.

Alsheikh, Mohammad Abu, et al., "Machine Learning in Wireless Sensor Networks: Algorithms, Strategies, and Applications," Mar. 19, 2015, 23 pages.

(56) References Cited

OTHER PUBLICATIONS

Author Unknown, "White Paper on Service Enabler Virtualization," Draft dated Nov. 9, 2015, 26 pages, Open Mobile Alliance (OMA), San Diego, CA, USA.

Baccour, Nouha, et al., "Radio Link Quality Estimation in Wireless Sensor Networks: A Survey," 2011, 35 pages.

Fan, NA, "Learning Nonlinear Distance Functions Using Neural Network for Regression with Application to Robust Human Age Estimation," Abstract, 1 page, IEEE International Conference on Computer Vision (ICCV), Nov. 2011, Institute of Electrical and Electronics Engineers, Barcelona, Spain.

Flushing, Eduardo Feo, et al.: "A mobility-assisted protocol for supervised learning of link quality estimates in wireless networks," Feb. 2012, 8 pages.

Fortunato, Santo, "Community Detection in Graphs", arXiv:0906.0612v2 [physics.soc-ph]; Physics Reports 486, 75-174, Jan. 25, 2010, 103 pages.

Godsill, Simon, et al., "Detection and suppression of keyboard transient noise in audio streams with auxiliary keybed microphone," Abstract, 1 page, 2015 IEEE International Conference on Acoustics, Speech and Signal Processing (ICASSP), Apr. 19-24, 2015, Brisbane, QLD, Australia (Abstract available at http://ieeexplore.ieee.org/document/7177995/, downloaded on Feb. 28, 2018.

Hershey, Shawn, et al., "CNN Architectures for Large-Scale Audio Classification," Jan. 10, 2017, 5 pages, Google, Inc., New York, NY, and Mountain View, CA, USA.

Hui, J., et al., "An IPv6 Routing Header for Source Routes with the Routing Protocol for Low-Power and Lossy Networks (RPL)", Request for Comments 6554, Mar. 2012, 12 pages, Internet Engineering Task Force Trust.

Kuklinski, Slawomir, et al., "Design Principles of Generalized Network Orchestrators," 2016 IEEE International Conference on Communications Workshops (ICC), May 23, 2016, pp. 430-435.

Liu, Tao, et al., "Data-driven Link Quality Prediction Using Link Features," ACM Transactions on Sensor Networks, Feb. 2014, 35 pages.

Mckenna, Shannon, et al., "Acoustic Event Detection Using Machine Learning: Identifying Train Events," Sep. 2017, pp. 1-5, http://cs229.stanford.edu/proi2012/McKennaMcLaren-AcousticEventDetectionUsingMachineLearningIdentifyingTrainEvents.pdf, downloaded on Feb. 8, 2018.

Newman, M. E. J., "Analysis of weighted networks," Phys. Rev. E 70, 056131, Jul. 20, 2004, 9 pages, http://arvix.org/pdf/condmat/0407503.pdf.

Newman, W. E. J., "Modularity and Community Structure in Networks", Proceedings of the National Academy of Sciences of the United States of America, Jun. 2006, vol. 103, No. 23, pp. 8577-8582, PNAS, Washington, DC.

Piczak, Karol J., "Environmental Sound Classification With Convolutional Neutral Networks," 2015 IEEE International Workshop on Machine Learning for Signal Processing, Sep. 17-20, 2015, Boston, USA.

Raghavendra, Kulkami V., et al., "Computational Intelligence in Wireless Sensor Networks: A Survey," Abstract, 1 page, IEEE Communications Surveys & Tutorials, May 27, 2010.

Salamon, Justin, et al., "Deep Convolutional Neutral Networks and Data Augmentation for Environmental Sound Classification," IEEE Signal Processing Letters, Accepted Nov. 2016, 5 pages.

Siddiky, Feroz Ahmed, et al., "An Efficient Approach to Rotation Invariant Face Detection Using PCA, Generalized Regression Neural Network and Mahalanobis Distance by Reducing Search Space," Abstract, 1 page, 10th International Conference on Computer and Information Technology, Dec. 2007, Dhaka, Bangladesh.

Singh, Shio Kumar, et al., "Routing Protocols in Wireless Sensor Networks—A Survey," International Journal of Computer Science & Engineering Survey (IJCSES) vol. 1, No. 2, Nov. 2010, pp. 63-83.

Tang, Pengcheng, et al., "Efficient Auto-scaling Approach in the Telco Cloud using Self-learning Algorithm," 2015 IEEE Global Communications Conference (Globecom), Dec. 6, 2015, pp. 1-6.

Tang, Yongning, et al., "Automatic belief network modeling via policy interference for SDN fault localization," Journal of Internet Services and Applications, Jan. 20, 2016, pp. 1-13, Biomed Central Ltd., London, UK.

Ting, Jo-Anne, et al., "Variational Bayesian Least Squares: An Application to Brain-Machine Interface Data," Neural Networks, vol. 21, Issue 8, Oct. 2008, pp. 1112-1131, Elsevier.

Tsang, Yolanda, et al., "Network Radar: Tomography from Round Trip Time Measurements," ICM'04, Oct. 25-27, 2004, Sicily, Italy.

Vasseur, JP., et al., "Routing Metrics Used for Path Calculation in Low-Power and Lossy Networks," Request for Comments 6551, Mar. 2012, 30 pages, Internet Engineering Task Force Trust.

Winter, T., et al., "RPL: IPv6 Routing Protocol for Low-Power and Lossy Networks," Request for Comments 6550, Mar. 2012, 157 pages, Internet Engineering Task Force Trust.

Zhang, Xiaoju, et al., "Dilated convolution neutral network with LeakyReLU for environmental sound classification," Abstract, 1 page, 2017 $22^{nd}$ International Conference on Digital Signal Processing (DSP), Aug. 23-25, 2017, London, U.K.

Zinkevich, Martin, et al. "Parallelized Stochastic Gradient Descent," 2010, 37 pages.

Author Unknown, "A Primer on the H.323 Series Standard," Version 2.0, available at http://www.packetizer.com/voip/h323/papers/primer/, retrieved on Dec. 20, 2006, 17 pages.

Author Unknown, ""I can see the future" 10 predictions concerning cell-phones," Surveillance Camera Players, http://www.notbored.org/cell-phones.html, Jun. 21, 2003, 2 pages.

Author Unknown, "Active screen follows mouse and dual monitors," KDE Community Forums, Apr. 13, 2010, 3 pages.

Author Unknown, "Implementing Media Gateway Control Protocols" A RADVision White Paper, Jan. 27, 2002, 16 pages.

Author Unknown, "Manage Meeting Rooms in Real Time," Jan. 23, 2017, door-tablet.com, 7 pages.

Averusa, "Interactive Video Conferencing K-12 applications," "Interactive Video Conferencing K-12 applications" copyright 2012. http://www.averusa.com/education/downloads/hvc brochure goved.pdf (last accessed Oct. 11, 2013).

Choi, Jae Young, et al; "Towards an Automatic Face Indexing System for Actor-based Video Services in an IPTV Environment," IEEE Transactions on 56, No. 1 (2010): 147-155.

Cisco Systems, Inc. "Cisco webex: WebEx Meeting Center User Guide for Hosts, Presenters, and Participants" © 1997-2013, pp. 1-394 plus table of contents.

Cisco Systems, Inc., "Cisco Webex Meetings for iPad and iPhone Release Notes," Version 5.0, Oct. 2013, 5 pages.

Cisco Systems, Inc., "Cisco WebEx Meetings Server System Requirements release 1.5." 30 pages, Aug. 14, 2013.

Cisco Systems, Inc., "Cisco Unified Personal Communicator 8.5", 2011, 9 pages.

Cisco Systems, Inc, "VXLAN Network with MP-BGP EVPN Control Plane Design Guide," Mar. 21, 2016, 44 pages.

Cisco White Paper, "Web Conferencing: Unleash the Power of Secure, Real-Time Collaboration," pp. 1-8, 2014.

Clarke, Brant, "Polycom Announces RealPresence Group Series" "Polycom Announces RealPresence Group Series" dated Oct. 8, 2012 available at http://www.323.tv/news/polycom-realpresence-group-series (last accessed Oct. 11, 2013).

Clauser, Grant, et al., "Is the Google Home the voice-controlled speaker for you?," The Wire Cutter, Nov. 22, 2016, pp. 1-15.

Cole, Camille, et al., "Videoconferencing for K-12 Classrooms, Second Edition (excerpt)," http://www.iste.org/docs/excerpts/VIDCO2-excerpt.pdf (last accessed Oct. 11, 2013), 2009.

Eichen, Elliot, et al., "Smartphone Docking Stations and Strongly Converged VoIP Clients for Fixed-Mobile convergence," IEEE Wireless Communications and Networking Conference: Services, Applications and Business, 2012, pp. 3140-3144.

Epson, "BrightLink Pro Projector," BrightLink Pro Projector. http://www.epson.com/cgi-bin/Store/jsp/Landing/brightlink-pro-interactive-projectors.do?ref=van brightlink-pro—dated 2013 (last accessed Oct. 11, 2013).

Grothaus, Michael, "How Interactive Product Placements Could Save Television," Jul. 25, 2013, 4 pages.

(56) References Cited

OTHER PUBLICATIONS

Hannigan, Nancy Kruse, et al., The IBM Lotus Samteime VB Family Extending The IBM Unified Communications and Collaboration Strategy (2007), available at http://www.ibm.com/developerworks/lotus/library/sametime8-new/, 10 pages.

Hirschmann, Kenny, "TWIDDLA: Smarter Than the Average Whiteboard," Apr. 17, 2014, 2 pages.

Infocus, "Mondopad," Mondopad. http://www.infocus.com/sites/default/files/InFocus-Mondopad-INF5520a-INF7021-Datasheet-EN.pdf (last accessed Oct. 11, 2013), 2013.

Maccormick, John, "Video Chat with Multiple Cameras," CSCW '13, Proceedings of the 2013 conference on Computer supported cooperative work companion, pp. 195-198, ACM, New York, NY, USA, 2013.

Microsoft, "Positioning Objects on Multiple Display Monitors," Aug. 12, 2012, 2 pages.

Mullins, Robert, "Polycom Adds Tablet Videoconferencing," Mullins, R. "Polycom Adds Tablet Videoconferencing" available at http://www.informationweek.com/telecom/unified-communications/polycom-adds-tablet-videoconferencing/231900680 dated Oct. 12, 2011 (last accessed Oct. 11, 2013).

Nu-Star Technologies, "Interactive Whiteboard Conferencing," Interactive Whiteboard Conferencing. http://www.nu-star.com/interactive-conf.php dated 2013 (last accessed Oct. 11, 2013).

Nyamgondalu, Nagendra, "Lotus Notes Calendar and Scheduling Explained!" IBM, Oct. 18, 2004, 10 pages.

Polycom, "Polycom RealPresence Mobile: Mobile Telepresence & Video Conferencing," http://www.polycom.com/products-services/hd-telepresence-video-conferencing/realpresence-mobile.html#stab1 (last accessed Oct. 11, 2013), 2013.

Polycom, "Polycom Turns Video Display Screens into Virtual Whiteboards with First Integrated Whiteboard Solution for Video Collaboration," Polycom Turns Video Display Screens into Virtual Whiteboards with First Integrated Whiteboard Solution for Video Collaboration—http://www.polycom.com/company/news/press-releases/2011/20111027 2.html—dated Oct. 27, 2011.

Polycom, "Polycom UC Board, Transforming ordinary surfaces into virtual whiteboards" 2012, Polycom, Inc., San Jose, CA, http://www.uatg.com/pdf/polycom/polycom-uc-board-_datasheet.pdf, (last accessed Oct. 11, 2013).

Schreiber, Danny, "The Missing Guide for Google Hangout Video Calls," Jun. 5, 2014, 6 page.

Shervington, Martin, "Complete Guide to Google Hangouts for Businesses and Individuals," Mar. 20, 2014, 15 pages.

Shi, Saiqi, et al, "Notification That a Mobile Meeting Attendee Is Driving", May 20, 2013, 13 pages.

Stevenson, Nancy, "Webex Web Meetings for Dummies" 2005, Wiley Publishing Inc., Indianapolis, Indiana, USA, 339 pages.

Stodle. Daniel, et al., "Gesture-Based, Touch-Free Multi-User Gaming on Wall-Sized, High-Resolution Tiled Displays," 2008, 13 pages.

Thompson, Phil, et al., "Agent Based Ontology Driven Virtual Meeting Assistant," Future Generation Information Technology, Springer Berlin Heidelberg, 2010, 4 pages.

TNO, "Multi-Touch Interaction Overview," Dec. 1, 2009, 12 pages.

Toga, James, et al., "Demystifying Multimedia Conferencing Over the Internet Using the H.323 Set of Standards," Intel Technology Journal Q2, 1998, 11 pages.

Ubuntu, "Force Unity to open new window on the screen where the cursor is?" Sep. 16, 2013, 1 page.

VB Forums, "Pointapi," Aug. 8, 2001, 3 pages.

Vidyo, "VidyoPanorama," VidyoPanorama—http://www.vidyo.com/products/vidyopanorama/ dated 2013 (last accessed Oct. 11, 2013).

\* cited by examiner

SPEAKER ANTICIPATION

RELATED APPLICATIONS

This application claims priority to U.S. Provisional Patent Application No. 62/524,014 filed on Jun. 23, 2017, entitled "NEW SPEAKER ANTICIPATION," the entire contents of which is incorporated by reference in its entirety.

TECHNICAL FIELD

The present disclosure pertains to a videoconferencing system, and more specifically to anticipating a video switch to accommodate a new speaker.

BACKGROUND

Multi-endpoint videoconferencing allows participants from multiple locations to collaborate in a meeting. For example, participants from multiple geographic locations can join a meeting and communicate with each other to discuss issues, share ideas, etc. These collaborative meetings often include a videoconference system with two-way audio-video transmissions. Thus, virtual meetings using a videoconference system can simulate in-person interactions between people.

However, videoconferencing consumes a large amount of both computational and bandwidth resources. In order to conserve those resources, many videoconferencing systems devote resources depending on how much the videoconference needs to use each video source. For example, the videoconference system will expend more resources for a participant who is actively speaking than a participant who is listening or not directly engaged in the conversation, oftentimes by using low resolution video for the non-speaking participant and high resolution video for the actively speaking participant. When the participant who is speaking changes, the videoconferencing server will switch from the first speaker to the current speaker's video source, and/or will increase the prominence of the new speaker in the videoconference display.

However, current methods of speaker detection and video switching are slow and depend on detecting a participant who is already speaking. For example, attention delay due to the time for processing the active speakers, confusion in audio sources (e.g., mistakenly identifying a closing door or voices from another room as a speaking participant), and/or not picking up on other cues (e.g., the speaker pauses to draw on a whiteboard) are common problems. Thus, there is a need to improve the accuracy and speed of in-room speaker detection and switching.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

OVERVIEW

Figure 1:
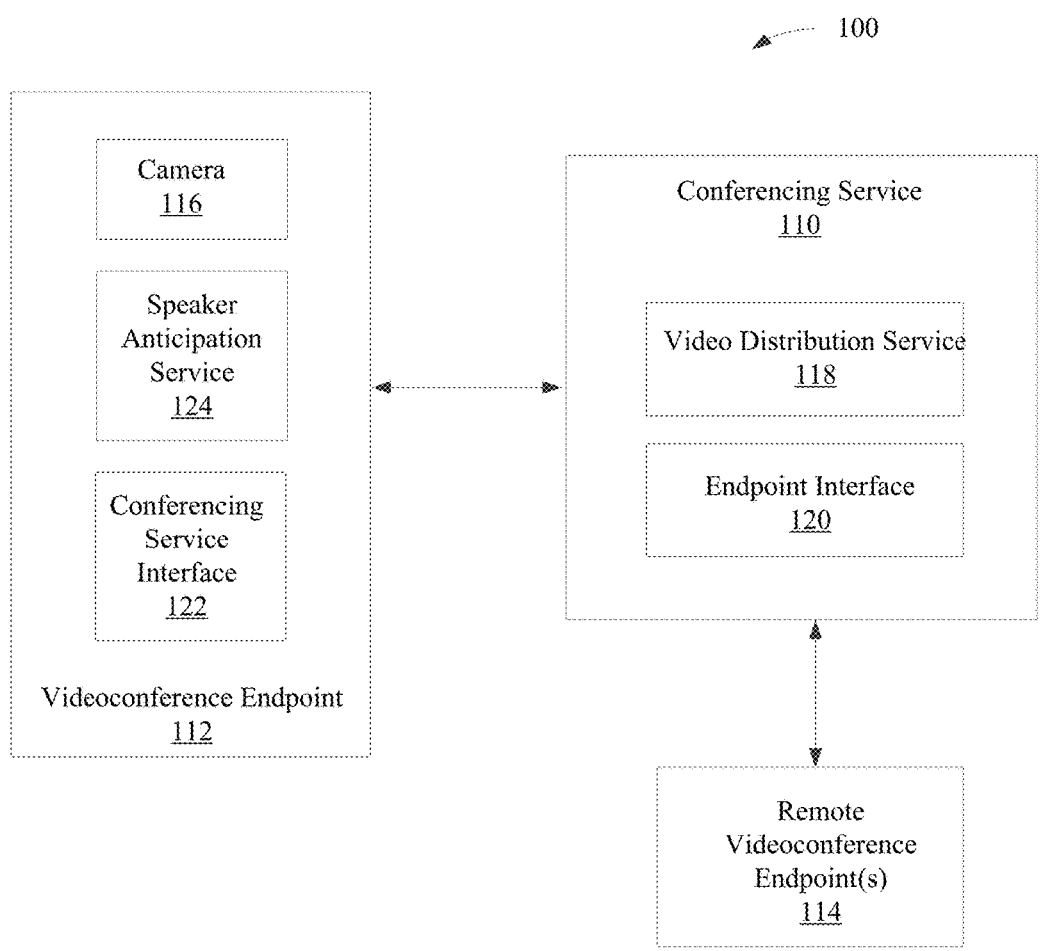
FIG. 1 shows an example block diagram illustrating an example environment for a videoconference system providing speaker anticipation capabilities, in accordance with various embodiments of the subject technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

In some embodiments, the disclosed technology addresses the need in the art for improving the accuracy and speed of in-room speaker detection and switching. Making selections of newly active speakers as early as possible is advantageous for a number of reasons, since computational and bandwidth resources are conserved when each video source contributes to the videoconference proportional to its use, such that less prominent sources are sent in a form suitable for use at small scale, and only the most prominent sources are sent at high bandwidth.

Thus, in some embodiments, once it is determined that one of multiple contributing endpoints is about to begin speaking, the bandwidth can be uprated on that contribution link to an operating point suitable for prominent display, so that the transition in operating point is not visible and does not delay the switch to prominence. Additionally and/or alternatively, the determination of a new speaker affects the content that is sent in the videoconference stream. For example, the cameras may begin to find, focus, and/or center on the predicted new speaker. The cameras may also frame one or multiple new speakers based on the prediction. For instance, if two conference participants sitting next to each other are preparing to speak at similar times (e.g., take frequent turns speaking or simultaneously speak), cameras in the conference room can be controlled to focus on both of the speakers to frame them at the same frame.

In some embodiments, the present technology is a videoconference system for anticipating a video switch to accommodate a new speaker in a videoconference. Anticipation is based on a model, which can have multiple inputs. Since there may be no single indicator to predict the next speaker, a multimodal architecture is more likely to produce stronger predictions that reduce the delay in selecting new speakers—both in the room, and among discrete contributing participants in separate rooms. Video can be used in conjunction with audio and other in-room metrics (including audio/visual data collected by an application on a participant's mobile phone) to anticipate their speech. This anticipation optimizes both the switching between speakers within the room and the transmitted bandwidths of participants contributing to a videoconference meeting.

The videoconference system includes multiple endpoints across multiple geographic locations, with a videoconference server configured to host a multi-endpoint meeting amongst the multiple endpoints. The videoconference includes at least one videoconference endpoint and at least one endpoint remote from the videoconference endpoint, although a meeting can be any combination of local and remote videoconference endpoints.

The videoconference system predicts a need to switch video by anticipating a new speaker through a predictive model that uses behavioral analytics, which is done by analyzing a real time video stream captured by a camera located at a videoconference endpoint. The real time video stream is analyzed according to one or more speaker anticipation models that predict whether a participant is preparing to speak.

A videoconference server receives, from the videoconference endpoint participating in the meeting or videoconference, a prediction of a new speaker. The server receives new speaker predictions from all or a portion of the endpoints participating in the video conference, both local and remote, such that it receives one or more predictions of new speakers at each of those endpoints.

Based on the received prediction, the videoconference server determines an allocation of media bandwidth that will be distributed to the participating endpoints, including both local and remote endpoint(s). Default allocations may be low resolution/low bandwidth video or audio unless a participant is speaking or is determined to be likely to speak soon, in which case the bandwidth allocation may be increased. If the bandwidth allocation is increased based on a prediction that a participant is preparing to speak at the videoconference endpoint, the videoconference server will request upgraded video of that participant from the videoconference endpoint according to the allocation that been determined or allotted.

In embodiments, the allocation of media bandwidth is determined based on the score of the prediction. For example, the allocation of bandwidth to a videoconference endpoint can be increased based on the strength of the prediction being high or above a predetermined threshold. The allocation of bandwidth may also and/or alternatively be based on comparing the score of the videoconference endpoint's prediction with other endpoints participating in the videoconference.

Once the videoconference endpoint receives the videoconference server's request for upgraded video of the anticipated speaker, the videoconference endpoint transmits video of the anticipated speaker in accordance with the request. The videoconference system then distributes the video of the anticipated new speaker to at least one other videoconference endpoint participating in the videoconference.

DETAILED DESCRIPTION

FIG. 1 shows an example block diagram illustrating an example environment for a videoconference system providing speaker anticipation capabilities, in accordance with various embodiments of the subject technology. In some embodiments the disclosed technology is deployed in the context of a conferencing service system having content item synchronization capabilities and collaboration features, among others. An example videoconference system configuration 100 is shown in FIG. 1, which depicts conferencing service 110 interacting with videoconference endpoint 112 and remote videoconference endpoint(s) 114.

FIG. 1 shows an embodiment in which conferencing service 110 is in communication with one or more videoconference endpoints (e.g., videoconference endpoint 112 and remote videoconference endpoint 114). Videoconference endpoints are any devices that are in communication with conference service 110, such as mobile phones, laptops, desktops, tablets, conferencing devices installed in a conference room, etc. In some embodiments, videoconference endpoint 112 is specific to a single conference participant, and the videoconference is a web meeting. In other embodiments, videoconference endpoint 112 is part of a video conference room system that includes a number of conference participants.

Real time video is generated at videoconference endpoint 112 in response to the initiation of a videoconference meeting, so that the participants at each videoconference endpoint can view and/or hear participants at other videoconference endpoints. As used herein, "real time" or "near real time" refers to relatively short periods of time. "Real time" does not imply instantaneous, but is often measured in fractions of a second, or seconds. "Near real time" is often measured in seconds to minutes.

Videoconference endpoint 112 comprises camera 116 that captures real time video at videoconference endpoint 112, such as real time video of at least one conference participant participating in the videoconference meeting. The system uses camera 116 to capture real time video to monitor conferencing participants in the videoconference, which can then be provided as input into behavioral analytics which form a predictive model for who is likely to speak next. Camera's 116 media channels can contribute a number of factors, including gaze change, head movement, a participant inhaling (indicator of speaking), hand raise or other hand gesture, sitting up straight, etc. Conferencing service 110 receives the real time video stream from videoconference endpoint 112 from all or a portion of that endpoint's participants, which is then distributed to remote videoconference endpoint 114.

Video distribution service 118 determines how the real time video stream is distributed to remote videoconference endpoint 114. Video distribution service 118 can determine, for example, the bandwidth that is devoted to downloading from videoconference endpoint 112, and/or the quality of video from videoconference endpoint 112. Accordingly, if a participant is preparing to speak at video conference endpoint 112, video distribution service 118 will send a request for upgraded or high resolution video from video conference endpoint 112. In some embodiments, the upgraded/high resolution video of videoconference endpoint 112 comprises only a single conference participant. In other embodiments, the upgraded/high resolution video will be a single conference participant among multiple conference participants within a videoconference room system. Video distribution service 118 can request video at low resolutions for participants who are not speaking and are not likely to speak, or the system can default to low resolution video unless it is determined that a participant is speaking or is likely to speak.

Endpoint interface 120 distributes the real time video stream from videoconference endpoint 112 to remote endpoint 114 based on the determinations from video distribution service 118. Each endpoint, such as videoconference endpoint 112, interfaces with conferencing service 110 through their respective conferencing service interface 122. Conferencing service interface 122 receives conferencing service 110 requests and transmits real time video stream for distribution to remote endpoint 114 in accordance with those requests (e.g., transmitting upgraded/higher resolution video or downgraded/low resolution/default video).

Figure 2:
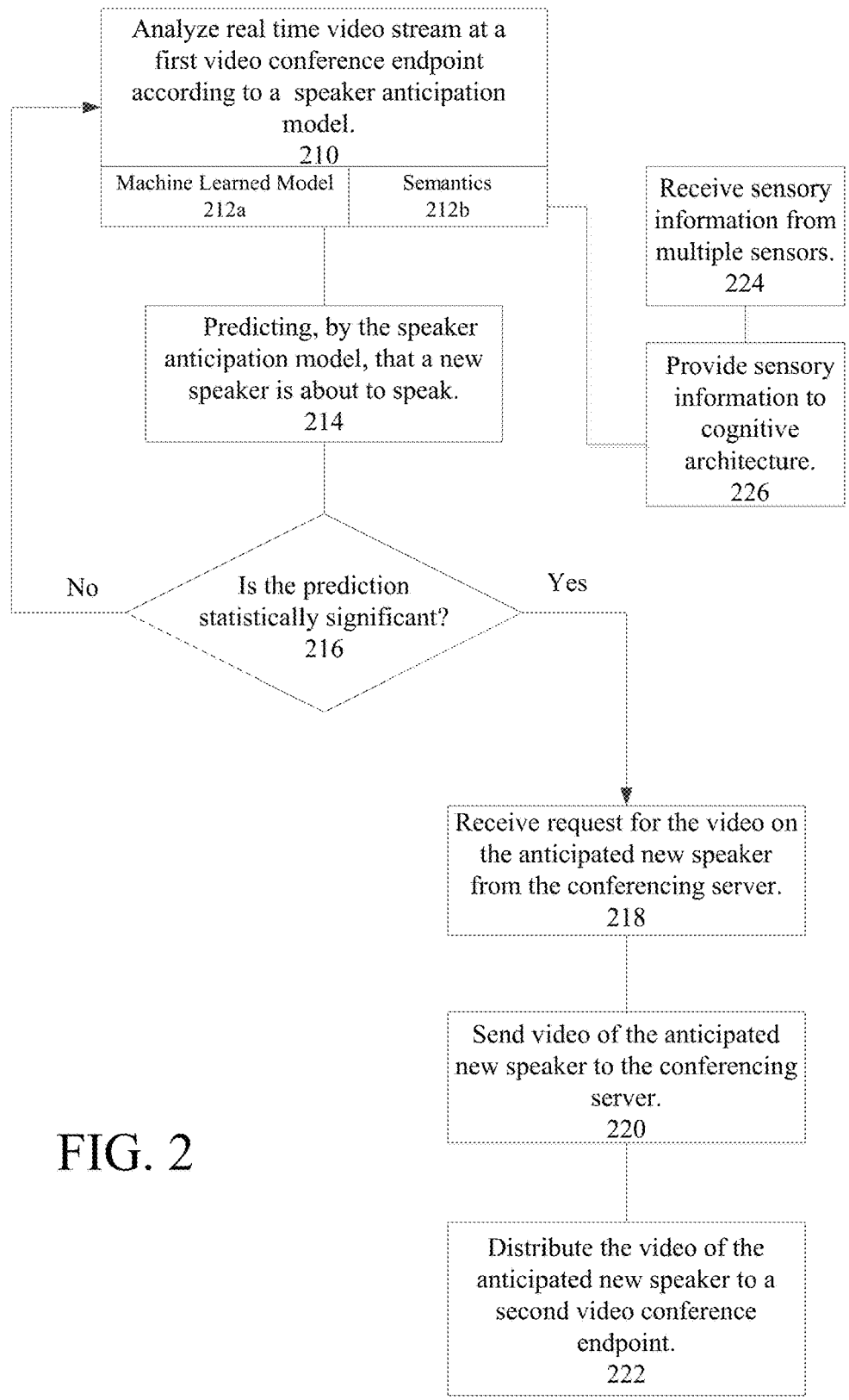
FIG. 2 is a flowchart illustrating an exemplary method for anticipating a video switch to accommodate a new speaker in a videoconference.

New speakers are anticipated based at least in part on analyzing real time video stream from videoconference endpoint 112. In reference to FIG. 2, which shows a flowchart illustrating an exemplary method for anticipating a video switch in order to accommodate a new speaker, videoconference endpoint 112 analyzes the real time video stream captured by camera 116 according to at least one speaker anticipation model (step 210).

Speaker anticipation service 124 determines and/or applies at least one speaker anticipation model to real time video stream and/or data derived from real time video stream. For example, speaker anticipation model may be one or a combination of machine learned models that predict, based on video images and/or data, that a participant is about to speak (step 212a). Examples of neural networks are Convolution Neural Network (CNN) and Long Short-Term memory (LSTM).

As a complimentary embodiment, the speaker anticipation model can comprise one or more semantics-based (Semantics) models (step 212b), the details of which will be discussed more fully herein. After a new speaker has been predicted, and as the system switches to the new speaker, videoconference endpoint 112 can continue to monitor the conference room using a diverse array of sensory inputs. The sensory inputs can be sensory information collected from a number of sensors within the conference room, such as one or more cameras, microphones, motion detectors, ultrasonic devices that pair to mobile devices (in order to receive sensor data collected on the mobile devices), and/or any other sensors capable of collecting sensory information relevant to building a cognitive representation of the videoconference endpoint's environment for in room activities. Accordingly, the semantics models may be determined by receiving the sensory information from diverse sensory inputs (step 224) and then providing that sensory information to a cognitive architecture (e.g., an example cognitive architecture can be Bayesian paradigms or similar).

Based on the speaker anticipation model applied, speaker anticipation service 124 determines a prediction that a participant is about to speak (step 214). In some embodiments, the prediction can be a binary prediction. For example, the prediction may only have one of two values (e.g., 1=participant is likely to speak; 0=participant will not speak).

In other embodiments, the prediction may be more detailed. For example, the speaker anticipation model can determine if the prediction is statistically significant (step 216), and may only transmit the prediction to conferencing service 110 if the prediction is sufficiently significant. For example, speaker anticipation service 124 may have a cutoff threshold, wherein the prediction fails to be transmitted if its prediction score is less than a predetermined percentage or value. Additionally and/or alternatively, if the prediction is not statistically significant, speaker anticipation service 124 may end there and/or continue analyzing the real time video stream at videoconference endpoint 112 until there is a significant prediction (or the videoconference ends). In other embodiments, speaker anticipation service 124 may transmit the prediction to conferencing service 110 regardless of the prediction's score.

Figure 3:
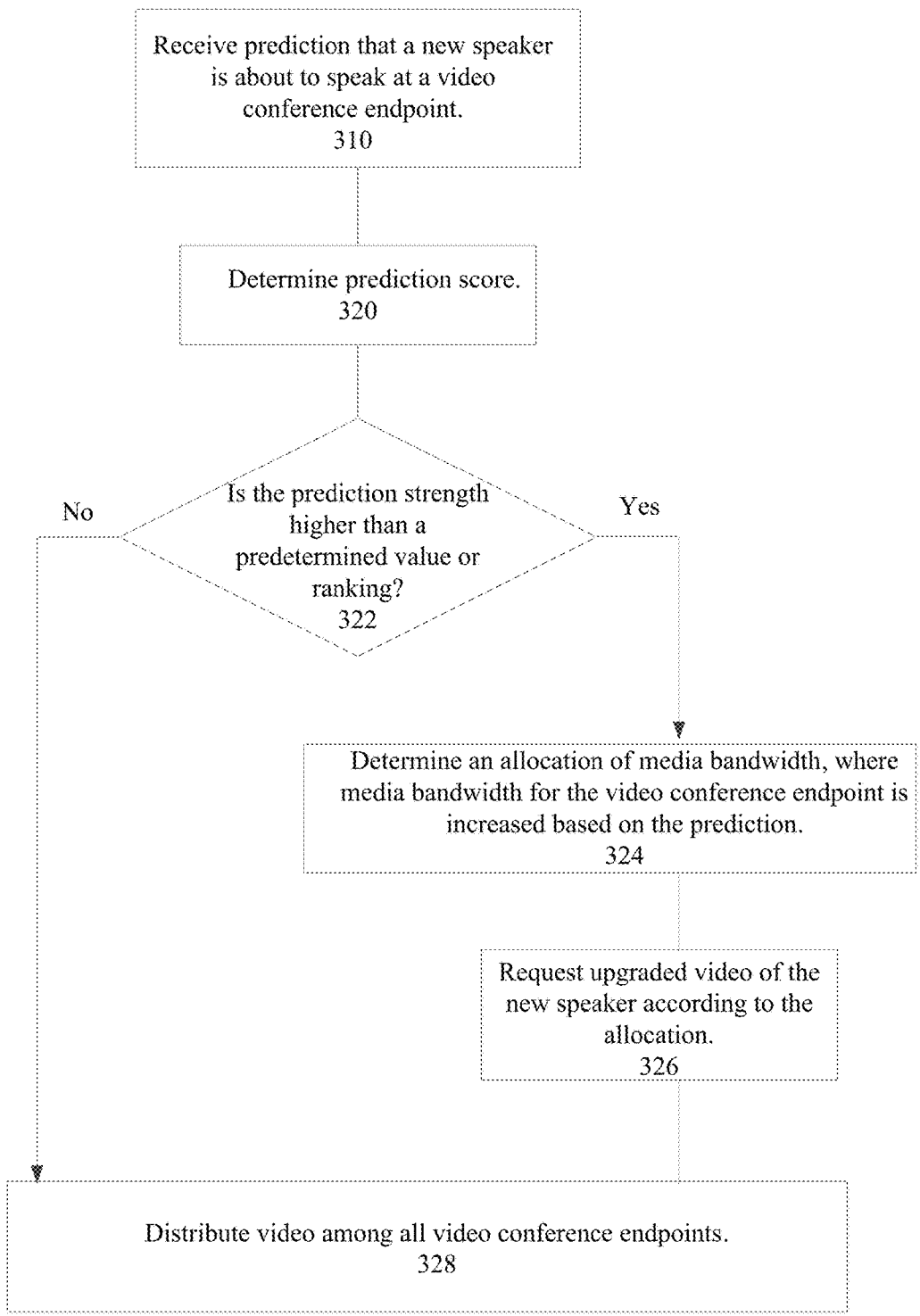
FIG. 3 is a flowchart illustrating an exemplary method for accommodating a new speaker in a videoconference.

In reference to FIG. 3, which shows a flowchart illustrating an exemplary method for accommodating a new speaker in a videoconference, conferencing service 110 receives the prediction at videoconference endpoint 112 (step 310). Conferencing service 110 determines a prediction score (step 320), either through receiving the prediction score from videoconference endpoint 112, by comparison to predictions from remote videoconference endpoint 114, or both.

For example, conferencing service 110 can determine whether the prediction score exceeds a cutoff threshold— e.g., the prediction must be at least 75% likely that the participant will begin speaking, prediction error must be below 1%, noise in the prediction must be below 0.25%, the confidence interval must be above 1.96, etc.

Additionally and/or alternatively, conferencing service 110 can determine prediction scores based on comparisons to predictions from at least one remote videoconference endpoint 114 by ranking the predictions against each other. The highest ranked prediction, for example, can be designated as the new anticipated speaker. As an example, for videoconference displays that enable more than one speaker to be displayed prominently, the top three predictions can be designated as new speakers. In some embodiments, the top ranked predictions may also need to also meet a certain cutoff threshold (e.g., only the top 3 predictions above 75% likelihood will be distributed, or are even available to be ranked).

If the prediction score fails to meet the predetermined threshold and/or ranking, then the video is distributed among all videoconference endpoints at its default bandwidth or is downgraded to a lower resolution (e.g., videoconference endpoint 112 transmits a real time video stream at its default quality or at a downgraded/lower resolution video) (step 322). However, if the prediction score meets or exceeds the predetermined threshold and/or ranking, conferencing service 110 then modifies or determines a new allocation of the media bandwidth for the videoconference endpoints (step 324). The allocation of the media bandwidth for videoconference endpoint 112, in particular, is increased based on the prediction and/or prediction score associated with videoconference endpoint 112.

Conferencing service 110 requests the upgraded video of the anticipated speaker from videoconference endpoint 112 according to the allocation determined (step 326). Referring back to FIGS. 1 and 2, videoconference endpoint 112 receives the request from conferencing service 110 (step 218), such as at conferencing service interface 122. Based on the request or accompanying instructions of the request, conferencing service interface 122 communicates with camera 116 in order gather a real time video stream or transmit the real time video stream to conferencing service 110 in accordance with the allocation. As a result, videoconference endpoint 112 sends the upgraded video of the anticipated speaker to conferencing service 110 (step 220). The real time, upgraded video is distributed to remote endpoint 114 in accordance with the determined allocation (steps 222, 328).

Training the Model

Figure 4:
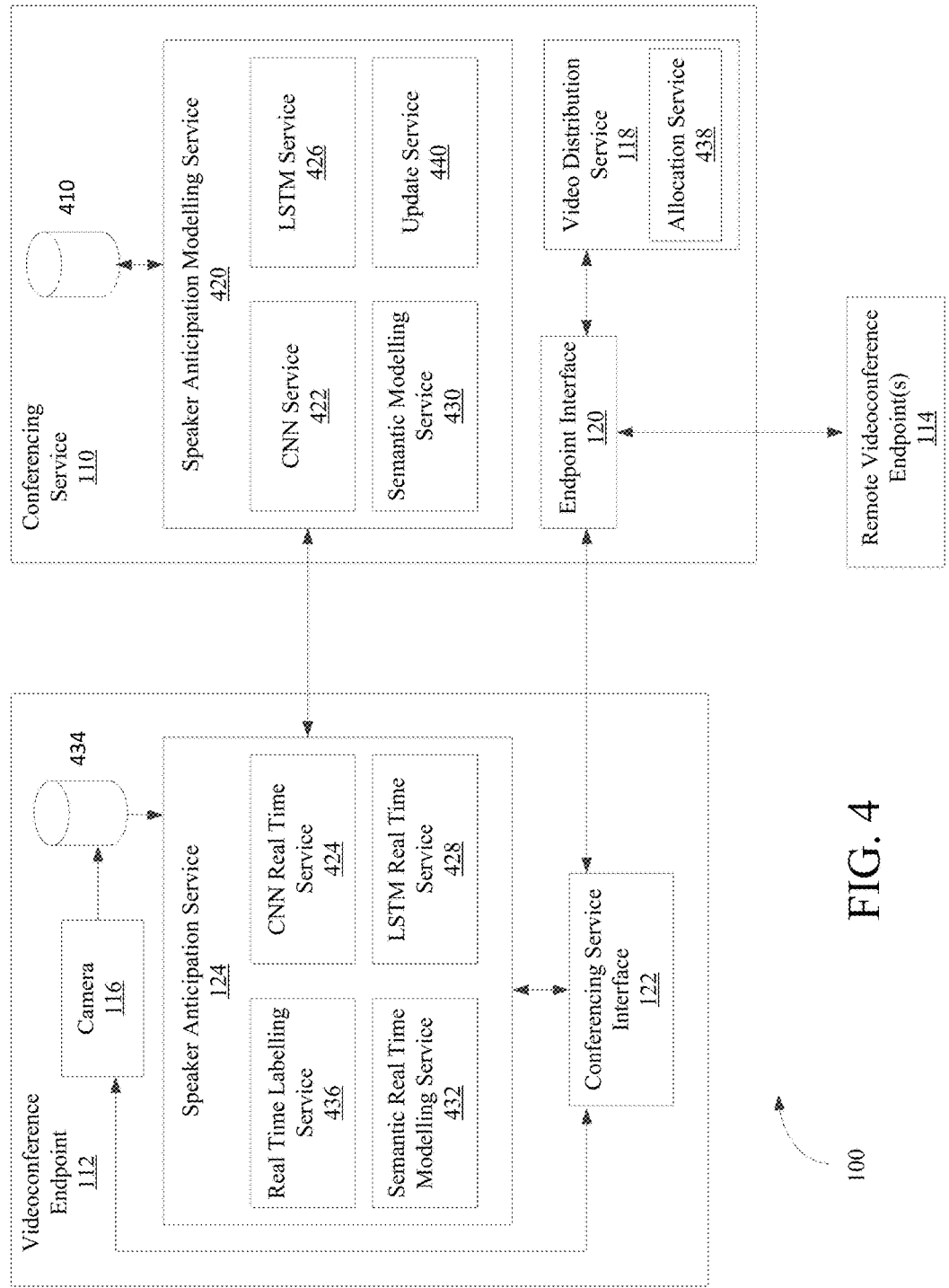
FIG. 4 is an illustration of a videoconference endpoint, conferencing service, and remote videoconference endpoint(s) used together in a multi-endpoint videoconference meeting interaction, in accordance with various embodiments.

FIG. 4 shows a detailed illustration of videoconference endpoint 112, conferencing service 110, and remote videoconference endpoint(s) 114 that are used together in a multi-endpoint videoconference meeting interaction, in accordance with various embodiments that train one or more speaker anticipation models. In embodiments represented by FIG. 4, videoconference system configuration 100 is enabled to determine a predictive, speaker anticipation model from a guided learning dataset from historical video feeds.

In some embodiments, videoconference endpoint 112 is specific to a single conference participant in a web meeting. Accordingly, the speaker anticipation model is trained by a guided learning dataset from historical video feeds including a single conference participant. In other embodiments, however, videoconference endpoint 112 is a video conference room system that includes multiple conference participants. The guided learning dataset is then historical video feeds that comprise all or a portion of the entire video conference room.

Figure 5A:
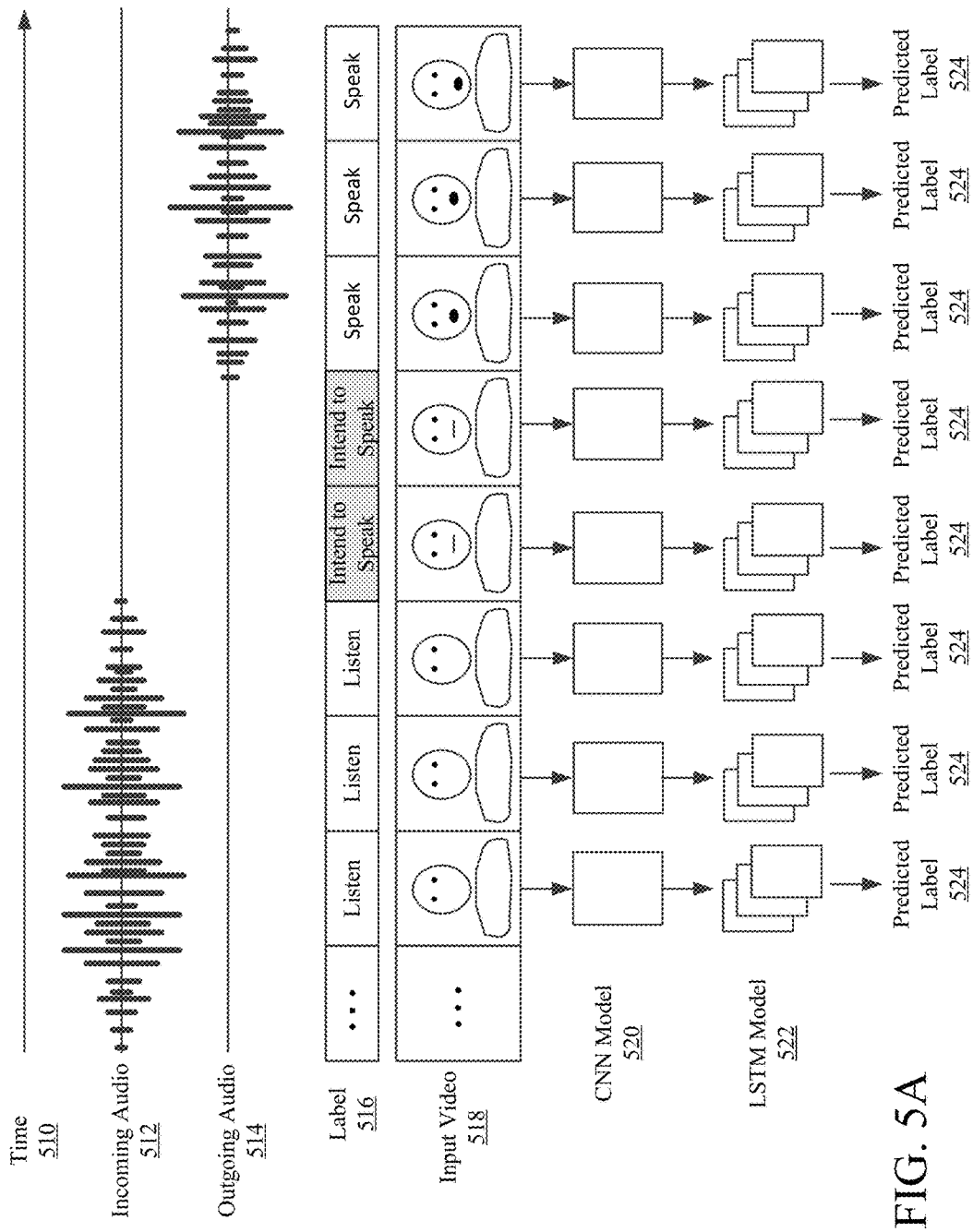
FIG. 5A shows an example training model in accordance with various embodiments.

The guided learning dataset is derived from a series of annotated video frames from historical video feeds. No assumptions are made in advance with regard to features predictive of a participant preparing to speak; any incoming information is potentially important. Accordingly, video frames are labeled as speaking frames when the video is accompanied by audio from the same endpoint, and are labeled as non-speaking or pre-speaking (e.g., is preparing to speak) for video frames that are not accompanied by audio. The frames and audio are collected from camera 116 at videoconference endpoint 112, which generates audio, visual, and/or multi modal data used to generate video feeds and the training models that are based off those video feeds. FIG. 5, for example, shows just such an example training model in accordance with various embodiments.

Referring to the embodiments described by FIG. 5, incoming audio 512 (e.g., audio signals transmitted to videoconference endpoint 112) and outgoing audio 514 (e.g., audio detected at videoconference endpoint 112 and transmitted to conferencing service 110) are measured and collected in relation to time 510. Thus, incoming audio 512 and outgoing audio 514 during a period of time is matched to video generated during the same time period.

The guided learning dataset is derived from a series of labeled video frames from the historical video feeds comprising video frames. Each frame of input video 518 that corresponds to a certain time is a data point that is manually annotated. For example, label 516 of input video 518 frames can refer to speaking, pre-speaking, or non-speaking frames. For example, "Speak" or "Speaking" is a label created for speaking frames that occur when the video is accompanied by audio from the same endpoint—e.g., during time periods where outgoing audio 514 generates an audio signal concurrently, which signifies that the participant is speaking during that time period. However, for video occurring at predetermined amounts of time preceding the audio signals (say, for example, 2-3 minutes before the "Speak" frames), the video frames can be labeled "Intend to Speak" or "Pre-Speak.". The "Pre-Speak" label signifies the frames in which the participant is preparing to speak, but has not uttered audio recognizable as speaking yet—such as, for example, video frames that are not accompanied by audio from the same endpoint but precede the frames labeled as speaking frames. So examples can be detecting the participant clearing their throat, changing their pattern of eye movement or focus, posture changes, etc. A "Listen" or "Non-Speaking" label is selected for all other, non-speaking frames (or, alternatively, all frames default to the "Listen" or "Non-Speaking" label unless designated otherwise).

Figure 6:
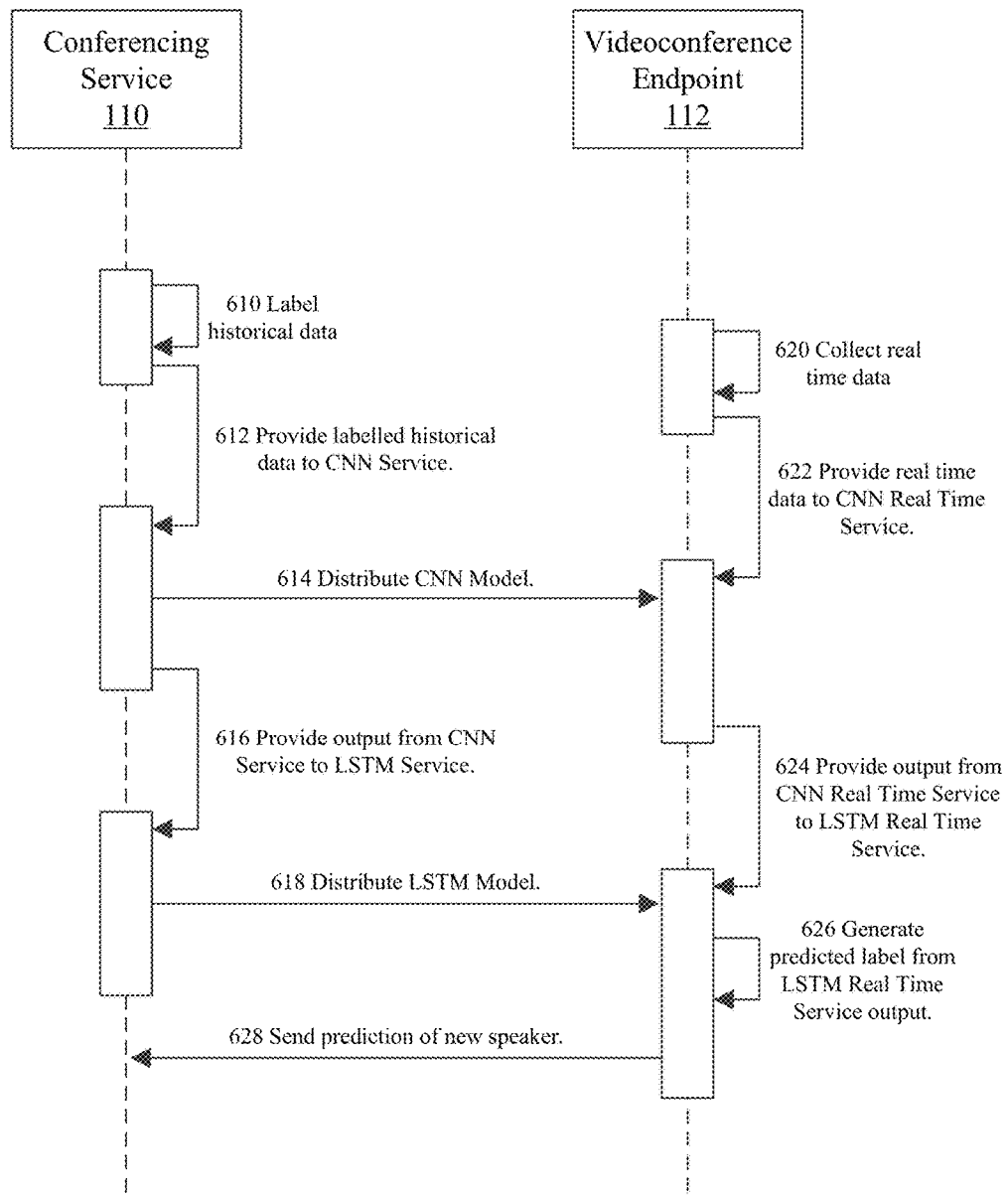
FIG. 6 shows an example diagram of a universal speaker anticipation model.

Referring to FIG. 6, which shows an example diagram of training and developing a universal speaker anticipation model, historical video feeds are labeled (610) on conferencing service 110. The labeled historical feeds can be stored in historical data feeds store 410, which provides a guided data set for training to speaker anticipation modeling service 420.

The speaker anticipation model is derived by training a deep learning CNN architecture on the guided learning dataset, which analyzes static frames to identify visual speaker anticipation cues. Since convolutional networks pass many filters over a single image (the filter corresponding to a feature potentially predictive of a participant preparing to speak), each time a match is found between the filter and portions of the image, the match is mapped onto a feature space particular to that visual element.

Speaker anticipation modeling service 420, for example, provides the labeled historical video feeds to CNN Service 422 (612). CNN Service 422 then applies CNN Model 520 to each of the labeled frames, which extracts and transforms features that help distinguish the participant's facial expression in each frame. Once CNN Service 422 has applied CNN Model 520 to some number of frames needed to determine a model (e.g., such that the model does not suffer from small number statistics), conferencing service 110 distributes (614) the determined CNN model to videoconference endpoint 112 by providing the trained CNN model to CNN real time service 424.

In some embodiments, the speaker anticipation model is further developed or derived by providing the output from the CNN architecture as input to an Long Short-Term Memory network (LSTM). An LSTM network is well-suited to learn from experience to classify, process and predict time series when there are time lags of unknown size and bound between important events Thus, it takes as its input not just the current input example, but also what they perceived one or more steps back in time, since there is information in the sequence itself.

Thus, the LSTM network uses the features extracted from CNN Model 520 to analyze sequences of frames, and sequences of the visual speaker anticipation cues. The multiple view frames enable the speaker anticipation model to account for dynamics and/or changes between frames that signify a participant is preparing to speak. Thus, LSTM Model 522 accounts for temporal dynamics in videos (i.e., the order of frames or facial expressions), which is effective in detecting subtle facial changes right before the participant utters the first word. Speaker anticipation modeling service 420, for example, provides the output from CNN Service 422 to LSTM Service 426 (616). LSTM Service 426 applies LSTM Model 522 to a series of the labeled frames, either before or after CNN Model 520 has been applied. Once LSTM Service 426 has applied LSTM Model 522 to a sufficient and representative number of frames needed to determine a reasonably accurate LSTM model, conferencing service 110 distributes (618) the determined LSTM model to videoconference endpoint 112 (e.g., provides the CNN model to LSTM real time service 428).

In some embodiments, the speaker anticipation model is determined based on a combination of CNN, LSTM, and the semantic representation model. In other embodiments, only the output of LSTM is the speaker anticipation model, or, alternatively, only the output of CNN determines the speaker anticipation model. Regardless of the combination used, the derived speaker anticipation model is provided to videoconference endpoint 112 as a trained model.

Additionally, the speaker anticipation model is further complemented by a semantic representation model. The semantic representation model enables the ability to focus on specific sensory data in the presence of distractions and background noise while still staying alert to relevant and/or important information that unexpectedly appears in the background. This ability implies the simultaneous operation of a selective filter and a deliberate steering mechanism that, together, performs efficient allocation of cognitive resources. For example, the cameras can change directionality, focus, and/or who is centered based on the deliberate steering mechanism. A camera attention mechanism for a principled Artificial General Intelligence (AGI) architecture can be built on top of Cisco Spatial Predictive Analytics DL pipelines for Deep Fusion.

Figure 5B:
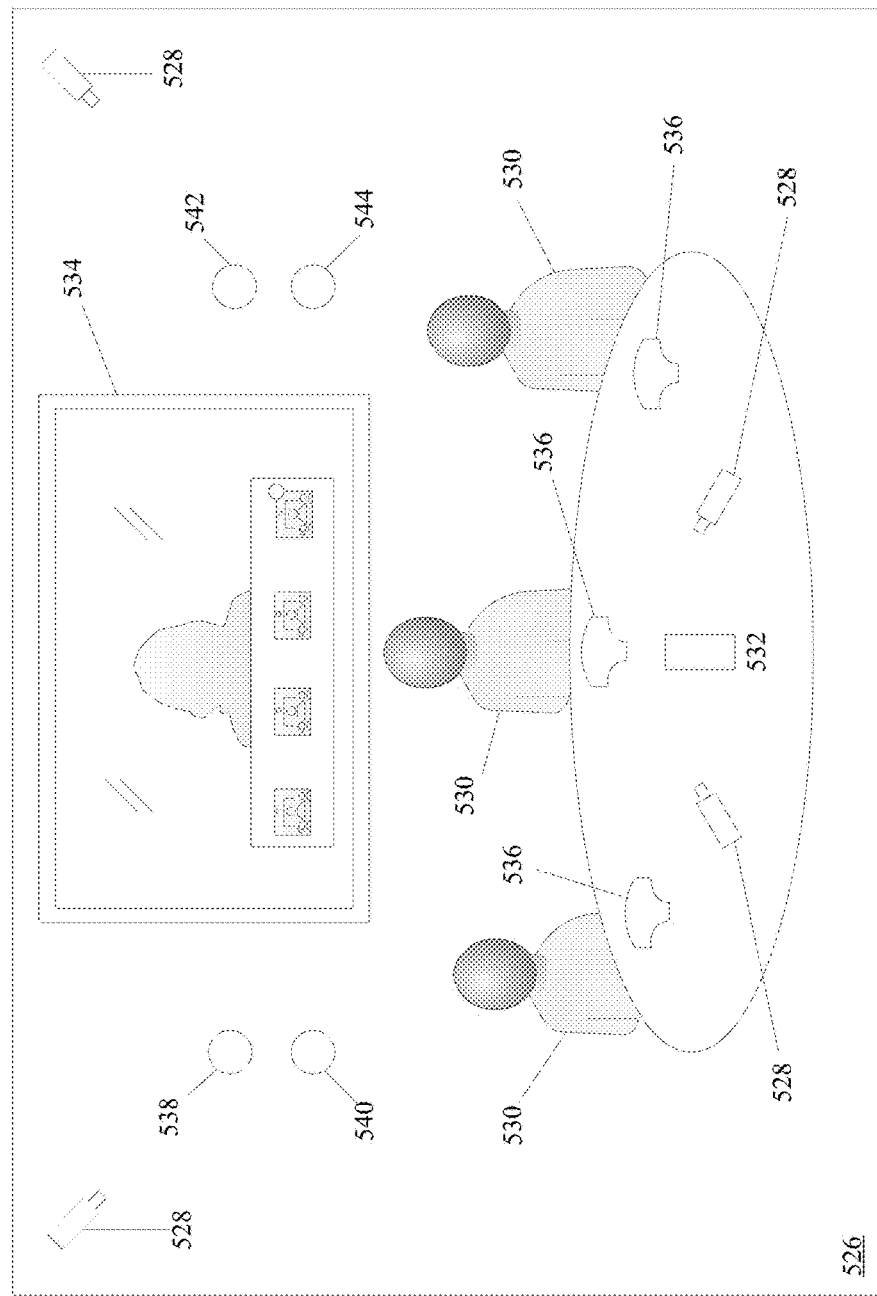
FIG. 5B shows an example conference room for determining a semantics model in accordance with various embodiments.

Turning to FIG. 5B, an example conference room for determining a semantics model in accordance with various embodiments is shown. Multiple conference participants 530 can be located within an immersive collaboration room (e.g., conference room 526) that is covered by a set of cameras 528. Cameras 528 can be multiple in number, and can be located in various positions throughout conference room 526 (e.g., on a conference table, mounted to a wall or ceiling, etc.), such that the environment of conference room 526 and/or conference participants 530 can be covered sufficiently. Conference room 526 can comprise conference assistant device 532 that controls the videoconference session, including one or more displays 534 that show remote endpoints participating in the conference.

As the system switches to one or more anticipated new speakers, the system can continue to monitor conference room 526. A cognitive architecture can be developed from diverse sensory inputs, such as inputs from one or more cameras 528, sensors included within conference assistant device 532, directional microphones 536, motion devices 538, time of flight detectors 540, ultrasonic devices 542 for pairing with conference participants' 530 mobile devices (e.g., microphone, accelerometer, and/or gyroscope data collected by the mobile device itself that could be useful in detecting aspects of conference room 526 environment), and/or any other device 544 capable of collecting sensory information relevant to building a cognitive representation of the videoconference endpoint's environment and/or in room activities.

The video conferencing system remains reactive to unexpected events while keeping the focus on the main speaker. This requires both deliberate top-down attention (i.e. information relevant to current goals receive processing) and reactive bottom-up attention (i.e. information relevant to other events that might be important for current goals receive processing). For example, at least one camera 528 is always focused on the entire room and detects movements and/or gestures of the room occupants. At least one other camera 528 can detect and track movements of at least one conference participant 530 that is of significance, and can furthermore be used to predict future actions of conference participants 530 based on previous actions. No assumptions can be made in advance with regards to the environment and system tasks; any incoming information is potentially important.

While primitive physical features and signal characteristics may give rough clues to the importance of information, this information is insufficient for focusing attention decisions. However, a cognitive AGI architecture adaptively trained on footage from several prior meeting room recordings and enactments (e.g., scripted meetings meant for training purposes) will provide sufficient information.

Once the system has built a sufficiently rich cognitive representation of its own environment for several such in room activities and built into the collaboration room systems, it continues to acquire video (together with any other input sensory information available) that is being used for video conferencing, and then uses that video to train on and detect more such actions and behavior for that particular room (e.g., conference room 526) based on a cognitive architecture. An example of a cognitive architecture can be self-learning Bayesian paradigms, although similar paradigms can be used. In this way, the system deployed in the immersive room becomes more accurate over time in ignoring trivial gestures, tightly focusing on actions that are significant, and evaluating the importance of incoming information. This defers processing decisions to actual execution time, at which time resource availability is fully known and information competes for processing based on attention-steered priority evaluation.

Accordingly, the semantic representation model analyzes multiple signals, including any combination of video data, audio data, and conference participant in-room location data, from historical videoconferences taking place in a specific meeting room.

In some embodiments, the semantic representation model complements and/or takes as it input the speaker anticipation model. The semantic representation model, in some embodiments, can be developed by providing annotated frames (raw input video 518 frames, frames from CNN model 520, frames from LSTM model 522, or frames from a combination of CNN and LSTM models) to semantic modeling service 430. Once semantic modeling service 430 has applied the semantic representation model to the number of frames needed to determine a model with sufficient confidence, conferencing service 110 distributes the determined semantic representation model to videoconference endpoint 112 (e.g., provides the trained semantic representation model to semantic real time modeling service 432.

Universal Speaker Anticipation Model

After providing the trained speaker anticipation model to videoconference endpoint 112, the speaker anticipation model can now be used in its real time, predictive context.

In FIGS. 4 and 6, speaker anticipation service 124 receives real time video frames 434 generated by camera 116. This collects real time data, such as audio, visual, and/or multi-modal data (620). The real time video frames are then analyzed according to the derived/trained speaker anticipation model in order to predict whether the participant in the frames is about to speak.

Real time frames 434 are provided to speaker anticipation service 124, which analyzes real time frames 434 according to the provided speaker anticipation model. Frames are predictively labeled based on the speaker anticipation model (e.g., labeled by real time labeling service 436) and is transmitted to conferencing service 110. In some embodiments, the predictive labels are passed through conferencing service interface 122 to endpoint interface 120, which communicates with video distribution service 118. Allocation service 438 then uses the predictive labels to determine an allocation of media bandwidth distributed to videoconference endpoint 112 and remote videoconference endpoint 114, where the allocation of media bandwidth of the videoconference endpoint 112 is increased based on the strength of the predictive labels.

For example, in the embodiments shown in FIG. 6, a universal model is applied in its predictive capacity by applying a combination of CNN model 520 and LSTM model 522 to real time data. Real time frames 434, for example, are provided to CNN real time service 424 (622), which then applies CNN Model 520 to each real time frame. CNN Model 520 extracts and transforms features in real time that are predictive of the participant preparing to speak in the videoconference, such as features related to the participant's real time facial expression in each frame.

Once CNN Model 520 has been applied to the real time frames, the analyzed real time frames are provided (624) to LSTM real time service 428. LSTM Model 522 continues to be a machine learning algorithm that analyzes sequences of frames and sequences of the visual speaker anticipation cues, but in real time. LSTM real time service 428, for example, applies LSTM Model 522 to a series of the real time frames, which accounts for temporal dynamics in the real time videos (i.e., the order of frames or facial expressions), effective in detecting subtle facial changes right before the participant utters the first word.

Once LSTM real time service 428 has applied LSTM Model 522 to the real time frame sequences, a predicted label 524 is generated for each real time frame at real time labeling service 436 (626). Predicted label 524 can label real time frames as speaking, pre-speaking, or non-speaking frames based on the models applied. Predicted labels 524 for each frame and/or one or more predictions that a participant is about to speak is then sent to conferencing service 110 (628).

Additionally and/or alternatively, where videoconference endpoint 112 is a video conference room system that includes a plurality of conference participants, predicted labels 524 are furthermore generated based fully or in part on the semantic representation model being applied to real time video frames or sequences. The semantic representation model can make predictions based on semantic information, such as the context of the conference room. For example, cultural cues or cues personalized to the specific conference room can be illustrative of who the next speaker will be. Some examples may include detecting where an authority figure sits in the conference room (e.g., a CEO or practice group leader), and if other participants within the room turn to face them. Other examples may include distinguishing participants who sit outside the main conference room table, such that participants at the table are more likely to speak than those seated quietly in the room's periphery. Participants who are standing, begin to stand, walk towards a portion of the room reserved for speaking (e.g., podium, in front of a screen, etc.), and/or otherwise make more movements may also increase the probability they will speak. Semantic model should also distinguish between fidgeting or leaving participants, which does not necessarily signify that a participant wishes to speak.

In some embodiments, the speaker anticipation model is updated continuously. The models can be updated during the training process, as the model is applied to the real time video stream, and/or both. For example, speaker anticipation service 124 can send take the predicted label 524 and/or features from analyzed real time video frames as input to update service 440. Update service 440 updates the speaker anticipation model based on the analyzed labeled real time video frames, which can be used to update one or more of CNN service 422, LSTM service 426, or semantic modeling service 430. Speaker anticipation service 124 (e.g., CNN real time service 424, LSTM real time service 428, and/or semantic real time modeling service 432) can receive the updated models upon completion, or can periodically request for updated models. After the model is sufficiently trained, it can predict whether the participant will speak a few seconds before the first utterance. If there is audio from the participant, the predicted label 524 can provide corroboration to the speaker anticipation model. If there is no audio from the participant, update service 440 can modify and/or correct the speaker anticipation model.

Referring to FIG. 4, once a prediction is received by conferencing service 110, allocation service 438 determines an allocation of media bandwidth to be distributed to videoconference endpoint 112 and remote videoconference endpoint 114, where the allocation of media bandwidth of videoconference endpoint 112 is increased based on the strength of the received real time prediction.

In some embodiments, allocation service 438 ignores signals having a prediction below a threshold. In other embodiments, allocation service 438 ranks the received predictions according to one or more of the CNN model, LSTM model, or the semantic representation model. Rankings below a threshold may be ignored. For rankings above a threshold, endpoint interface 120 sends a request to videoconference endpoint 112 for high resolution video and/or upgraded video of the participant according to the allocation determined at allocation service 438. This prepares conferencing service 110 for switching video to the new participant who is expected to speak.

In response to receiving the request for video on the anticipated new speaker, videoconference endpoint 112 sends video of the anticipated new speaker to conferencing service 110. Video of the anticipated new speaker is distributed to remote videoconference endpoint 114 in accordance with allocation service 438. High resolution video, for example, can be sent to all other videoconference endpoints after detecting that the high resolution video from videoconference endpoint 112 includes a speaker.

Personalized Speaker Anticipation Model

Figure 7:
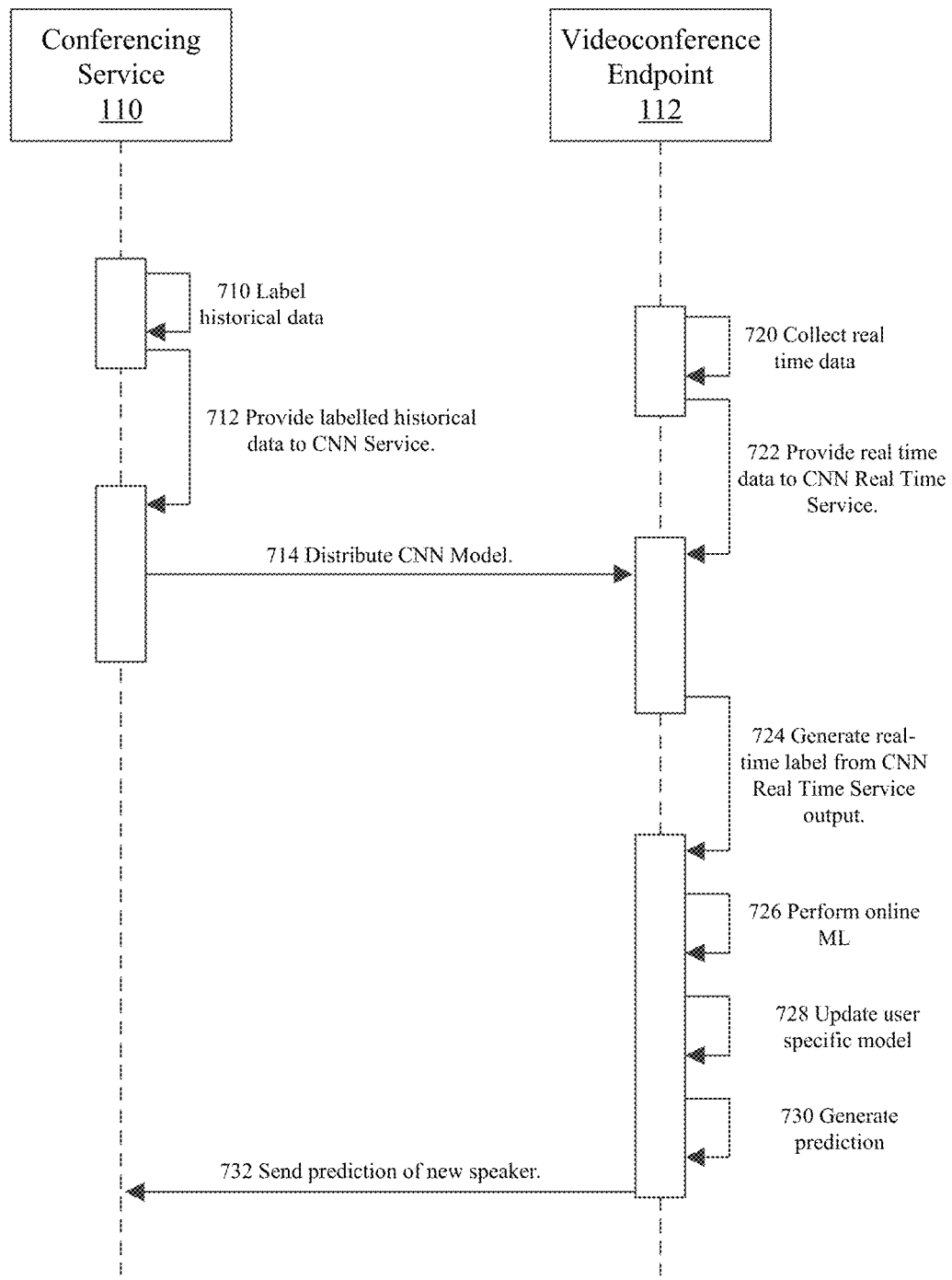
FIG. 7 shows an example diagram of a personalized speaker anticipation model.

FIG. 7 shows an example diagram of a personalized speaker anticipation model, in accordance with server embodiments. Like the embodiments described above, annotated historical data is collected, provided to one or more models for training, and distributed to videoconference endpoint 112 (710, 712, 714). Videoconference endpoint 112 collects real time data, provides it to the speaker anticipation model for analysis, and then generates predicted label 524 (720, 722, 724).

In order to personalize a speaker anticipation model, videoconference endpoint 112 performs online machine learning to extract detectable features that are uniquely correlated with the particular participant preparing to speak (726). The features videoconference endpoint 112 initially looks for may be based, at least partly, on features extracted by CNN model 520, LSTM model 522, and/or semantic representation model, but the features may be updated, modified, and/or added as videoconference endpoint 112 continues to train with the participant (728). Once videoconference endpoint 112 develops a model unique to the participant, it can apply that personalized speaker anticipation model to real time data in order to generate personalized predictions (730). Those personalized predictions are then sent to conferencing service 110 for allocation determinations.

Computing Machine Architecture

Figure 8:
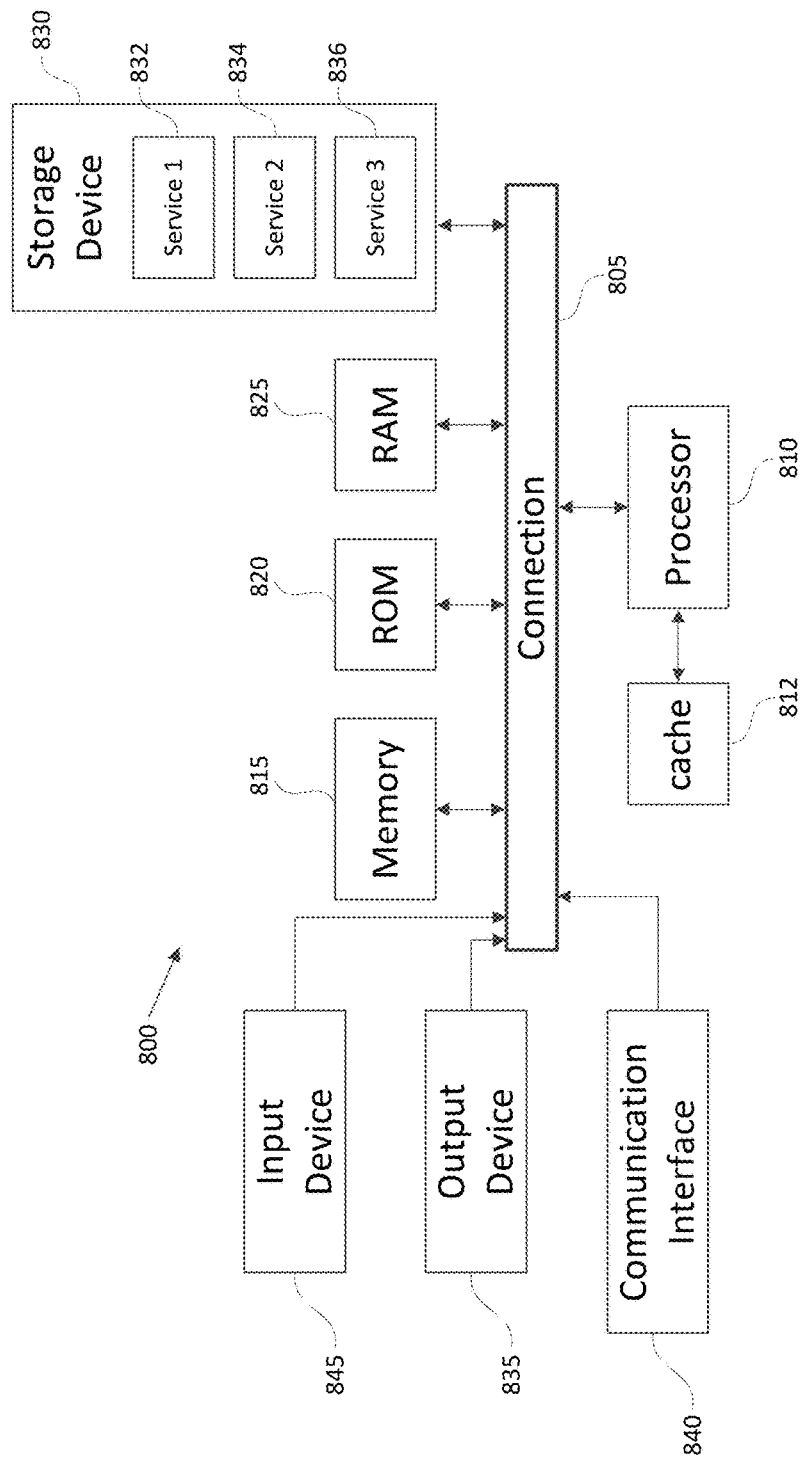
FIG. 8 shows an example of a system for implementing certain aspects of the present technology.

FIG. 8 shows an example of computing system 800 in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) and random access memory (RAM) to processor 810. Computing system 800 can include a cache of high-speed memory connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of anticipating a video switch to accommodate a new speaker in a video conference comprising:
   analyzing, by at least one speaker anticipation model, a real time video stream captured by a camera local to a first videoconference endpoint;
   predicting, by the at least one speaker anticipation model, that a new speaker is about to speak, the at least one speaker anticipation model trained by a guided learning dataset from historical video feeds derived from a series of labeled video frames from the historical video feeds of the new speaker, each of the labeled video frames including one of two different labels based on audio;

sending video of the new speaker to a conferencing server in response to a request for the video of the new speaker from the conferencing server; and distributing, via the conferencing server, the video of the new speaker to a second videoconference endpoint, wherein,
  each of the labeled video frames is default-labeled as a pre-speaking frame except for any of the labeled video frames including audio from a same endpoint, and
  each of the labeled video frames including the audio from the same endpoint is labeled as speaking frames.

2. The method of claim 1,
wherein,
  the first videoconference endpoint includes a conference participant,
  the video conference is a web meeting, and
  the historical video feeds include the conference participant.

3. The method of claim 1,
wherein,
  the at least one speaker anticipation model is derived by:
    training a first machine learning algorithm on the guided learning dataset, wherein the first machine learning algorithm analyzes static frames to identify visual speaker anticipation queues, and
    providing an output of the first machine learning algorithm as an input to a second machine learning algorithm,
    the second machine learning algorithm analyzes sequences of the static frames and sequences of the visual speaker anticipation queues, and
    the output of the second machine learning algorithm is the at least one speaker anticipation model.

4. The method of claim 1, further comprising:
analyzing video data consisting of the real time video stream captured by the camera local to the first videoconference endpoint to generate labeled real time video frames, the labeled real time video frames labeled as real time video speaking frames or real time video pre-speaking frames; and
applying a machine learning algorithm to analyze the labeled real time video frames and update the at least one speaker anticipation model.

5. The method of claim 1,
wherein,
  the first videoconference endpoint is a video conference room system that includes a plurality of conference participants, and
  the at least one speaker anticipation model is a semantic representation model created by a machine learning algorithm that has analyzed a plurality of signals including at least one of video data, audio data, and conference participant in-room location data, from historical videoconferences taking place in a specific meeting room.

6. The method of claim 5, further comprising:
ranking the plurality of signals captured during a real time video conference according to the semantic representation model;
ignoring signals having a ranking below a threshold; and
sending a request for high resolution video to the first videoconference endpoint when the ranking of at least one of the plurality of signals is above the threshold.

7. A videoconference system for anticipating a video switch to accommodate a new speaker in a video conference, the system comprising:
  a processor;
  a storage device in communication with the processor;
  a videoconference server in communication with the processor; and
  a camera in communication with the processor,
  a first videoconference endpoint participating in a multi-endpoint meeting hosted by the videoconference server, the first videoconference endpoint configured, via the storage device and the processor, to:
    analyze a real time video stream captured by the camera local to the first videoconference endpoint according to at least one speaker anticipation model;
    predict, by the at least one speaker anticipation model, that a new speaker is about to speak to yield a prediction, the at least one speaker anticipation model trained by a guided learning dataset from historical video feeds derived from a series of labeled video frames from the historical video feeds of the new speaker, each of the labeled video frames including one of two different labels based on audio;
    send video of the new speaker to the videoconference server in response to a request for the video of the new speaker from the videoconference server; and
    distribute the video of the new speaker to a second videoconference endpoint,
  wherein
    each of the labeled video frames is default-labeled as a pre-speaking frame except for any of the labeled video frames including audio from a same endpoint, and
    each of the labeled video frames including the audio from the same endpoint is labeled as speaking frames.

8. The first videoconference endpoint of claim 7, wherein the at least one speaker anticipation model is further derived by:
  training a first machine learning algorithm on the guided learning dataset; and
  providing an output of the first machine learning algorithm as an input to a second machine learning algorithm, the output of the second machine learning algorithm being the at least one speaker anticipation model.

9. The first videoconference endpoint of claim 8, wherein the first machine learning algorithm analyzes static frames to identify visual speaker anticipation queues.

10. The first videoconference endpoint of claim 9, wherein the second machine learning algorithm analyzes sequences of the static frames and sequences of the visual speaker anticipation queues.

11. The first videoconference endpoint of claim 7, wherein predicting that the new speaker is about to speak further comprises an attention mechanism associated with a conference room that comprises:
  collecting video, audio, and gesture recognition to perform a predictive analysis;
  allowing camera feed focus in real time; and learning which actions are significant to focus camera attention on.

12. The first videoconference endpoint of claim 7, further comprising:
   determining content of the distributed video based at least in part on the prediction; and
   wherein the prediction determines at least one of framing the new speaker or framing multiple anticipated new speakers at the same time.

13. A method of anticipating a video switch to accommodate a new speaker in a video conference, the method comprising the steps of:
   analyzing a real time video stream captured by a camera local to a first videoconference endpoint according to at least one speaker anticipation model;
   predicting, by the at least one speaker anticipation model, that a new speaker is about to speak, the at least one speaker anticipation model trained by a guided learning dataset from historical video feeds derived from a series of labeled video frames from the historical video feeds, each of the labeled video frames including one of two different labels based on audio;
   sending video of the new speaker to a conferencing server in response to a request for the video of the new speaker from the conferencing server;
   distributing the video of the new speaker to a second videoconference endpoint;
   ranking a plurality of signals captured during a real time video conference according to a semantic representation model;
   ignoring signals having a ranking below a threshold; and
   sending a request for high resolution video to the first videoconference endpoint when the ranking of at least one of the plurality of signals is above the threshold,
   wherein
      each of the labeled video frames is default-labeled as a pre-speaking frame except for any of the labeled video frames including audio from a same endpoint, and
      each of the labeled video frames including the audio from the same endpoint is labeled as speaking frames.

14. The method of claim 13,
   wherein,
      the first videoconference endpoint is a video conference room system that includes a plurality of conference participants.

15. The method of claim 13,
   wherein,
      the at least one speaker anticipation model is a semantic representation model created by a machine learning algorithm after analysis of a plurality of signals including video data, audio data, and conference participant in-room location data from historical videoconferences taking place in a meeting room.

* * * * *